US012372910B2

(12) United States Patent
Sato et al.

(10) Patent No.: US 12,372,910 B2
(45) Date of Patent: Jul. 29, 2025

(54) IMAGE FORMING APPARATUS HAVING SHEET BONDING APPARATUS

(71) Applicant: CANON KABUSHIKI KAISHA, Tokyo (JP)

(72) Inventors: Shun Sato, Kanagawa (JP); Taku Watanabe, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 20 days.

(21) Appl. No.: 18/411,303

(22) Filed: Jan. 12, 2024

(65) Prior Publication Data

US 2024/0241463 A1 Jul. 18, 2024

(30) Foreign Application Priority Data

Jan. 17, 2023 (JP) ................................ 2023-005244

(51) Int. Cl.
*G03G 15/00* (2006.01)
*B41L 43/00* (2006.01)
(Continued)

(52) U.S. Cl.
CPC .......... *G03G 15/6541* (2013.01); *B41L 43/02* (2013.01); *B65H 37/02* (2013.01); (Continued)

(58) Field of Classification Search
CPC ........... G03G 15/6541; G03G 15/6544; G03G 15/6588; G03G 15/6585; G03G 2215/00877; G03G 2215/00426; G03G 2215/00835; G03G 2215/00856; B65H 37/02; B65H 37/04; B65H 37/06; B65H 2301/164; B65H 2301/43822; B65H 2301/43827; B65H 2301/5113; B65H 2301/51616; B65H 2301/51614;
(Continued)

(56) References Cited

U.S. PATENT DOCUMENTS 5,213,560 A * 5/1993 Crowley ................ B42D 15/08
493/332
5,486,436 A * 1/1996 Lakes ................. B29C 65/7861
428/492
(Continued)

FOREIGN PATENT DOCUMENTS

JP H03-56162 A 3/1991
JP 2007-193004 A 8/2007
(Continued)

*Primary Examiner* — Robert B Beatty
(74) *Attorney, Agent, or Firm* — Venable LLP

(57) ABSTRACT

A sheet bonding apparatus includes an applying portion, a fixing portion, a folding portion, and a bonding portion including a heating member and a non-heating member which oppose to each other and which are for bonding the sheet by nipping the sheet therebetween. Two regions opposing to each other when the folding portion folds a sheet are a first region and a second region. In a case that when the bonding portion bonds the folded sheet, the first region is positioned on a heating member side and the second region is positioned on a non-heating member side, the applying portion applies the powdery adhesive so that an application amount of the powdery adhesive on the sheet is smaller in the first region than in the second region.

10 Claims, 17 Drawing Sheets

(51) Int. Cl.
*B41L 43/02* (2006.01)
*B65H 37/00* (2006.01)
*B65H 37/02* (2006.01)
*B65H 37/06* (2006.01)

(52) U.S. Cl.
CPC ......... *B65H 37/06* (2013.01); *G03G 15/6588* (2013.01); *B65H 2301/164* (2013.01); *B65H 2301/43827* (2013.01); *B65H 2301/5113* (2013.01); *B65H 2301/5162* (2013.01); *G03G 2215/00835* (2013.01); *G03G 2215/00877* (2013.01)

(58) Field of Classification Search
CPC ........ B65H 2301/5162; B65H 2801/06; B65H 2801/24; B65H 2801/27; B41L 23/20; B41L 23/24; B41L 43/02
USPC ........................... 399/408, 409; 270/8, 58.08
See application file for complete search history.

(56) References Cited

U.S. PATENT DOCUMENTS 5,803,889 A * 9/1998 Littman ................. B42D 15/08 493/216
6,394,728 B1 * 5/2002 Boss ..................... B42C 9/0081 412/1
6,980,767 B1 * 12/2005 Cahill ................ G03G 15/6544 399/407
8,215,538 B2 * 7/2012 Bethke ................... B65D 27/06 229/92.1
11,840,417 B2 12/2023 Matsuda et al.
2006/0051686 A1 * 3/2006 Ide ..................... G03G 15/2064 430/123.54
2006/0133871 A1 * 6/2006 Ishida ................ G03G 15/2064 399/341
2007/0164505 A1 * 7/2007 Ishibashi .................. B65H 7/02 271/226
2021/0191297 A1 * 6/2021 Yamaguchi ........ G03G 15/6573
2022/0035261 A1 * 2/2022 Shimano ................ G03G 9/135
2022/0035264 A1 * 2/2022 Yamashita ......... G03G 9/08797
2022/0035288 A1 * 2/2022 Matsuda ............ G03G 15/6544
2022/0035296 A1 * 2/2022 Nishizawa ............. B65H 31/02
2024/0241459 A1 * 7/2024 Watanabe ............ G03G 9/0819
2024/0241472 A1 * 7/2024 Sato ................... G03G 9/08795

FOREIGN PATENT DOCUMENTS

JP 2008-162029 A 7/2008
JP 2008169284 A * 7/2008
JP 2022-027018 A 2/2022
JP 2022-040915 A 3/2022

* cited by examiner

IMAGE FORMING APPARATUS HAVING SHEET BONDING APPARATUS

FIELD OF THE INVENTION AND RELATED ART

The present invention relates to a sheet bonding apparatus.

Conventionally an image forming apparatus of an electrophotographic type in which in the case where a document, such as a pay slip or a pressure-bonding postcard, of which contents have confidentiality and which is necessary to be closely sealed is prepared, a product in which confidential information is hermetically sealed by using printing toner and a powdery adhesive is outputted has been proposed (Japanese Laid-Open Patent Applications Nos. 2007-193004 and 2008-162029). In these image forming apparatuses, printing (transfer) of information using the printing toner and application (transfer) of the powdery adhesive onto a bonding scheduled region are performed for the sheet, and thereafter, the sheet is subjected to fixing and is folded, and then is further subjected to bonding processing (sealing) by pressing the sheet while heating the sheet.

However, in the case of the pressure-bonding postcard, the confidential information is printed inside the folded sheet, but on an outside of the folded sheet, there is a printing portion where printing is made with the toner. In the above-described image forming apparatus, the powdery adhesive is applied onto the sheet and heat is applied from a bonding member in subsequent bonding (processing), so that the powdery adhesive is softened by the heat and thus the bonding is performed. At this time, the bonding member directly contacts the toner at the printing portion positioned on the outside of the pressure-bonding postcard. Therefore, the toner at the printing portion was melted by the heat in some instances. When the toner at the printing portion is melted, the melted toner is also deposited on the bonding member. Then, an image defect such as print peeling such that the sheet is contaminated with the deposited toner at the printing portion through re-deposition of the deposited toner occurs in some cases.

SUMMARY OF THE INVENTION

The present invention has been accomplished view of the above-described circumstances. A principal object of the present invention is to provide a sheet bonding apparatus, for outputting a press-bonded print, capable of suppressing print peeling on an outside of the print in a bonding step.

According to an aspect of the present invention, there is provided a sheet bonding apparatus comprising: applying means configured to apply a powdery adhesive onto a sheet; fixing means configured to fix the powdery adhesive, on the sheet, applied onto the sheet by the applying means; folding means configured to fold the sheet passed through the fixing means; and bonding means configured to bond together folded surfaces of the sheet with the powdery adhesive by heating the sheet folded by the folding means, the bonding means including a heating member and a non-heating member which oppose to each other and which are for bonding the sheet by nipping the sheet therebetween, wherein two regions opposing to each other when the folding means folds the sheet are a first region and a second region, and wherein in a case that when the bonding means bonds the folded sheet, the first region is positioned on a heating member side and the second region is positioned on a non-heating member side, the applying means applies the powdery adhesive so that an application amount of the powdery adhesive on the sheet is smaller in the first region than in the second region.

Further features of the present invention will become apparent from the following description of exemplary embodiments with reference to the attached drawings.

Figure 5:
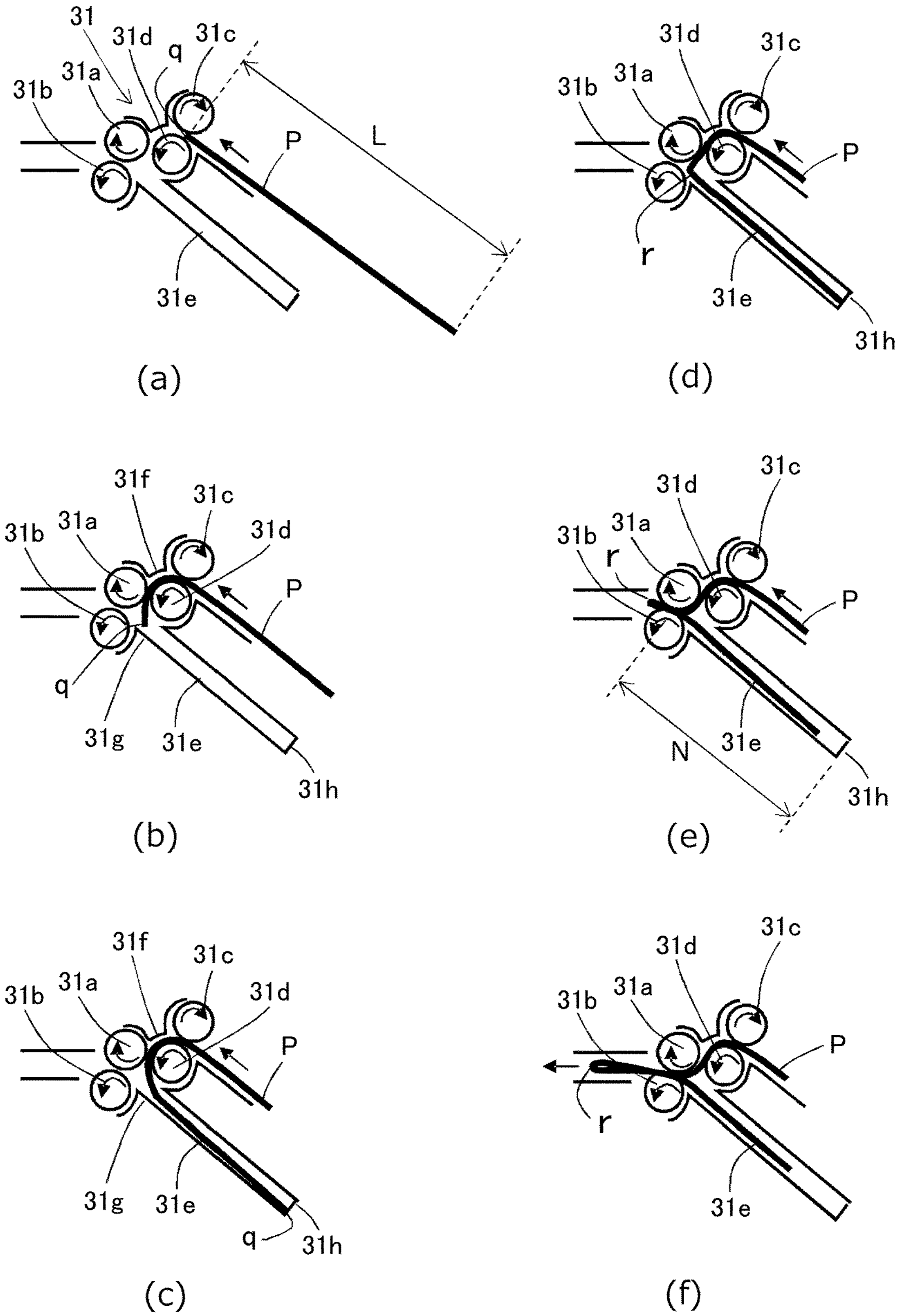

Parts (a) to (e) of FIG. 5 are schematic views for illustrating contents of a folding step in the embodiment 1.

Figure 6:
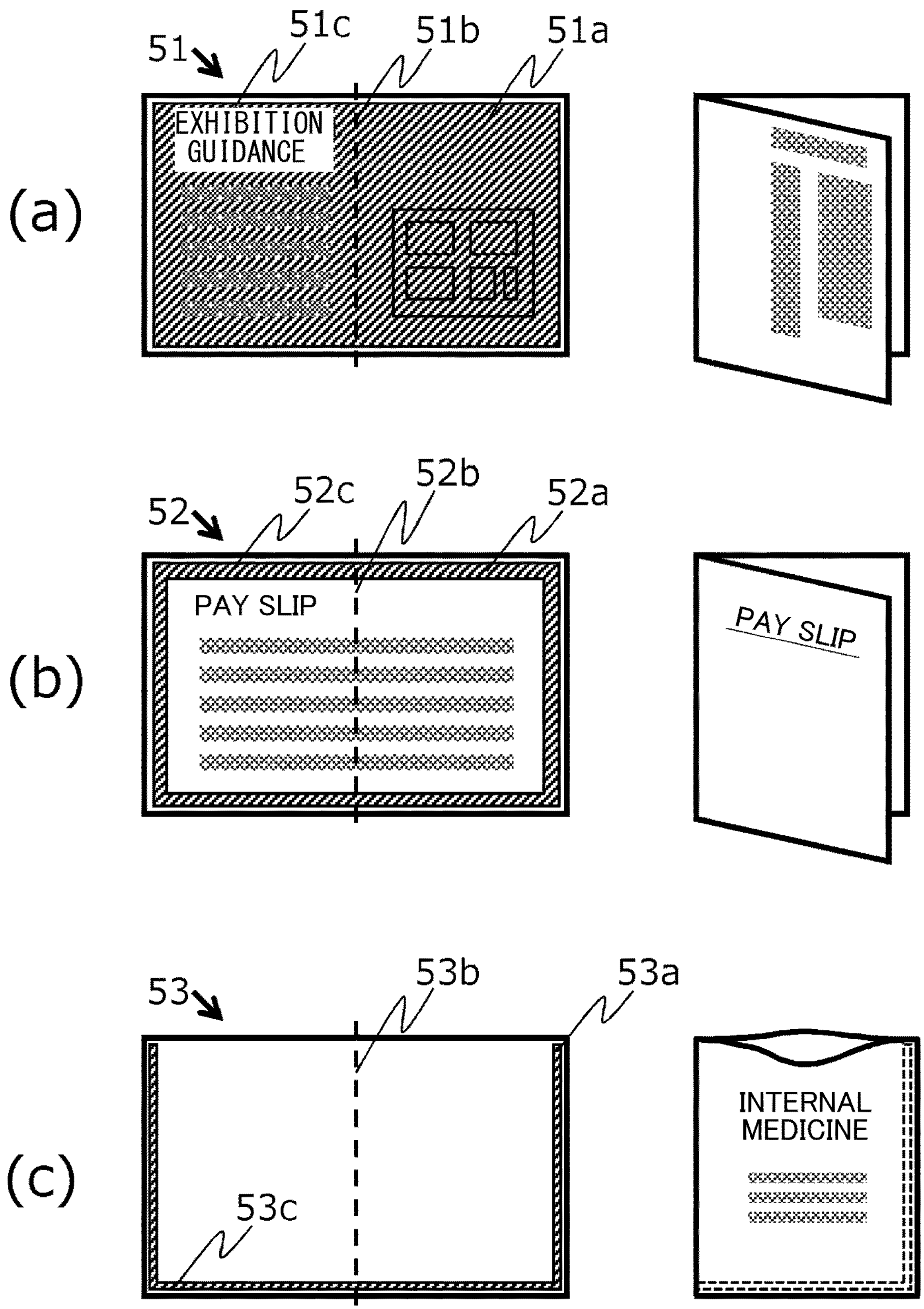

Parts (a) to (c) of FIG. 6 are schematic views each showing a bonding product of the sheet bonding apparatus of the embodiment 1.

Figure 7:
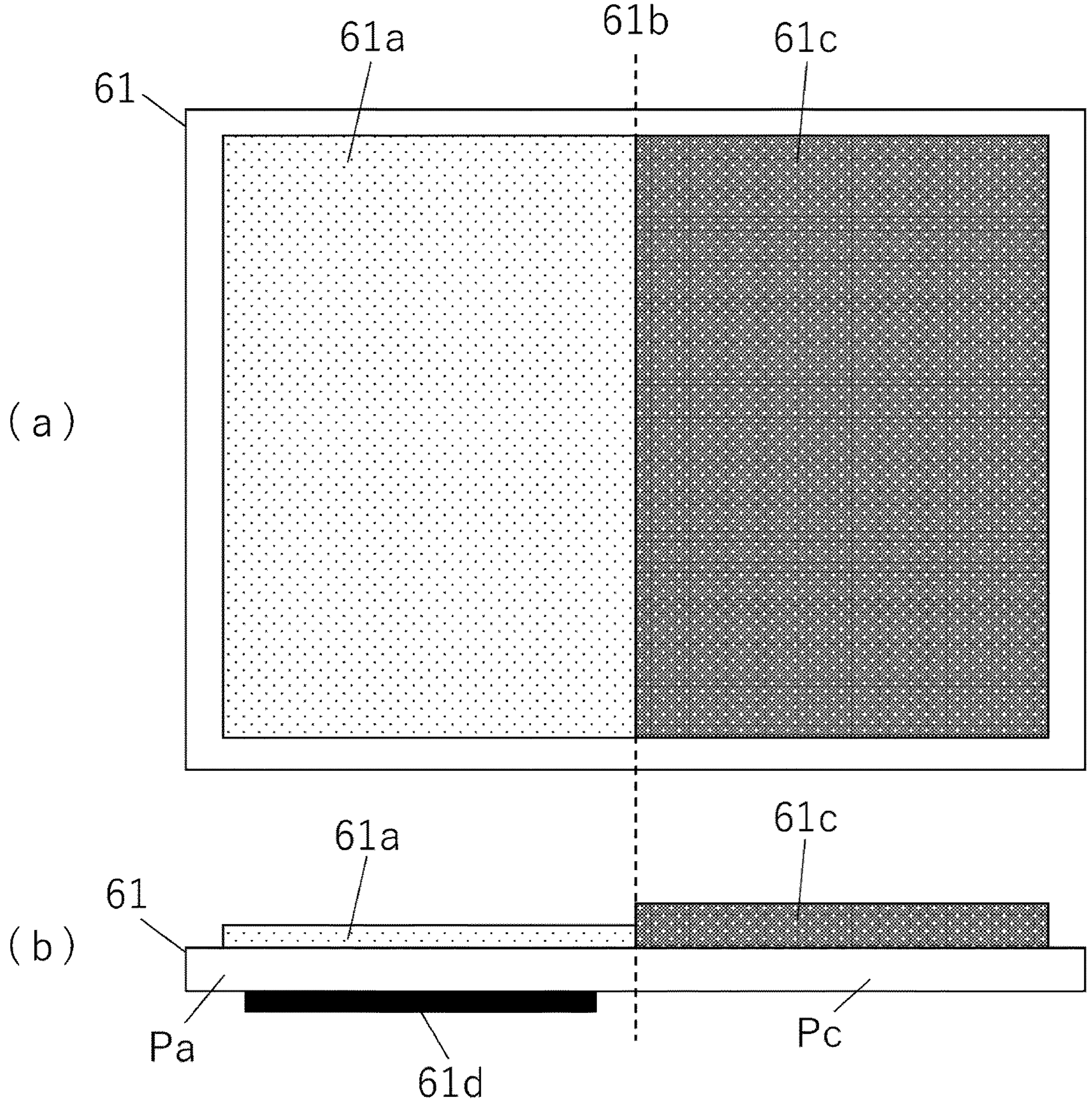

Parts (a) and (b) of FIG. 7 are schematic views showing an application region of a powdery adhesive Tn in the embodiment 1.

Figure 8:
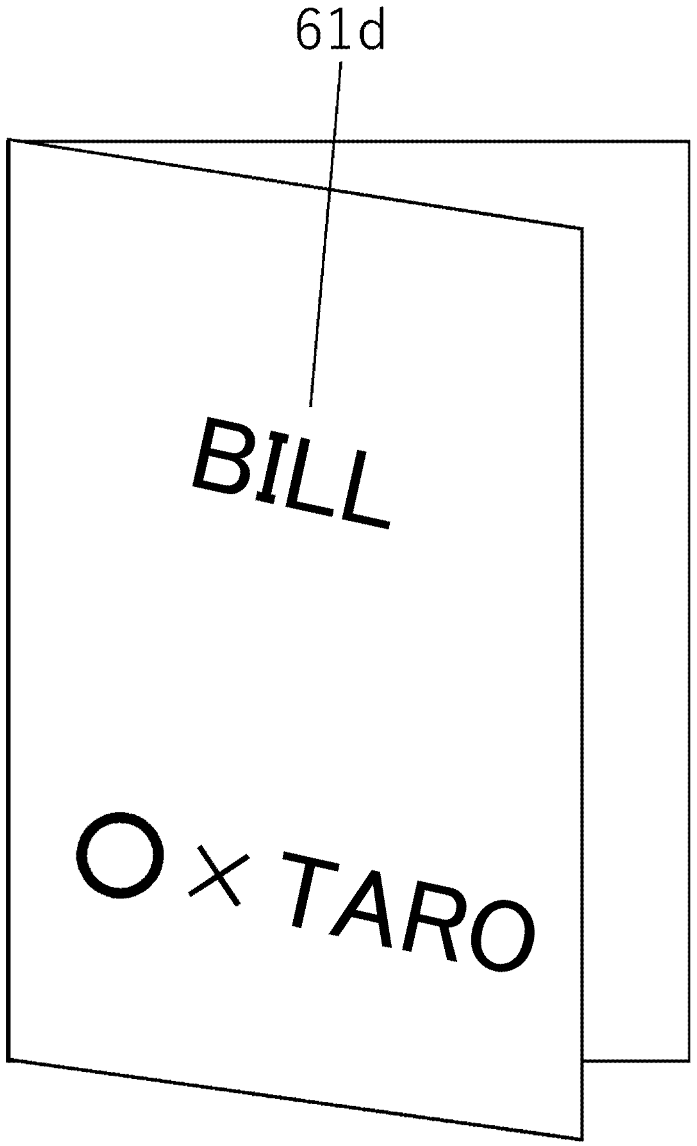

FIG. 8 is a schematic view showing an outside of a pressure-bonding postcard in the embodiment 1.

Figure 9:
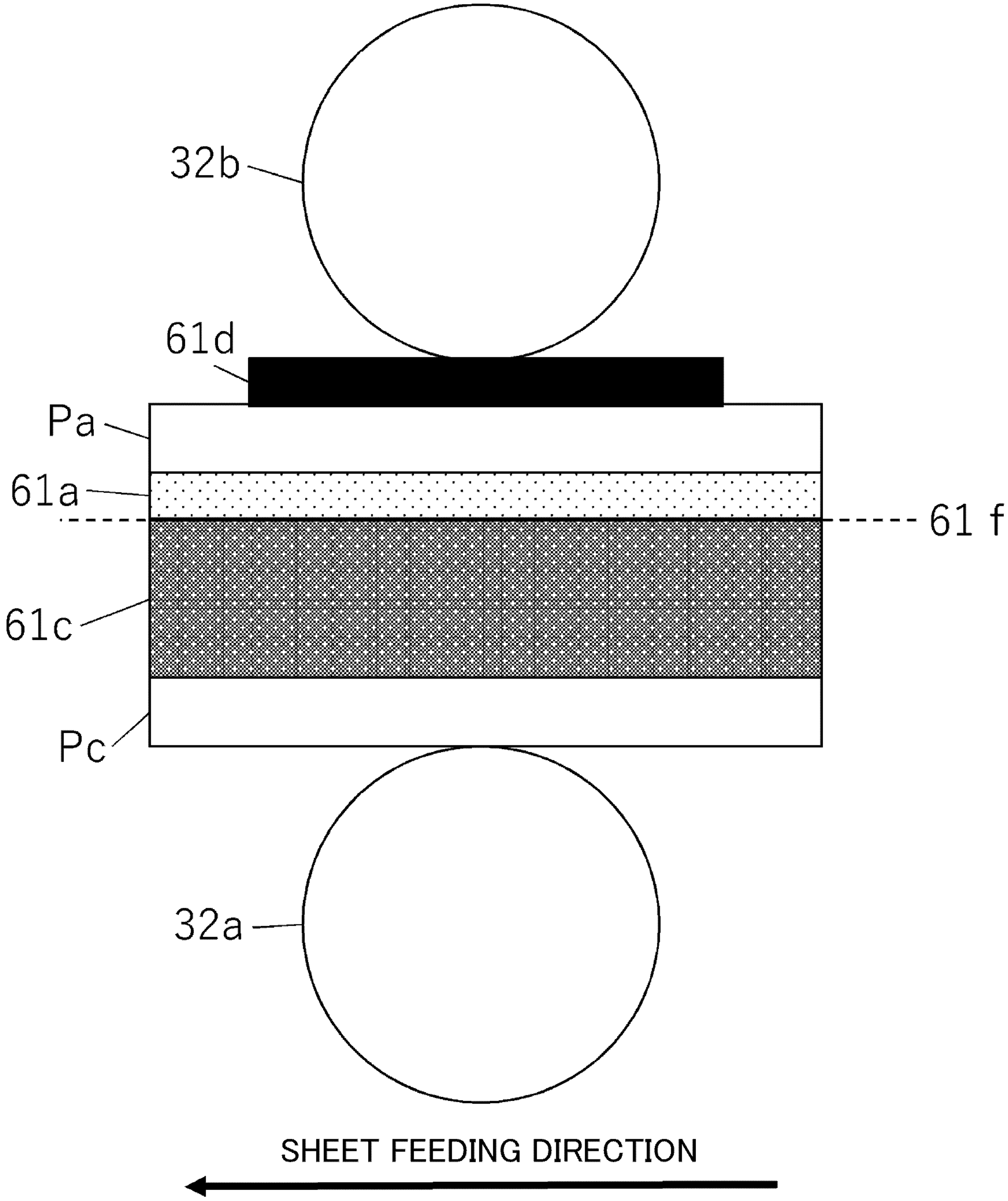

FIG. 9 is a schematic view of the pressure-bonding postcard as viewed in a cross-sectional direction in a pressure-bonding step in the embodiment 1.

Figure 10:
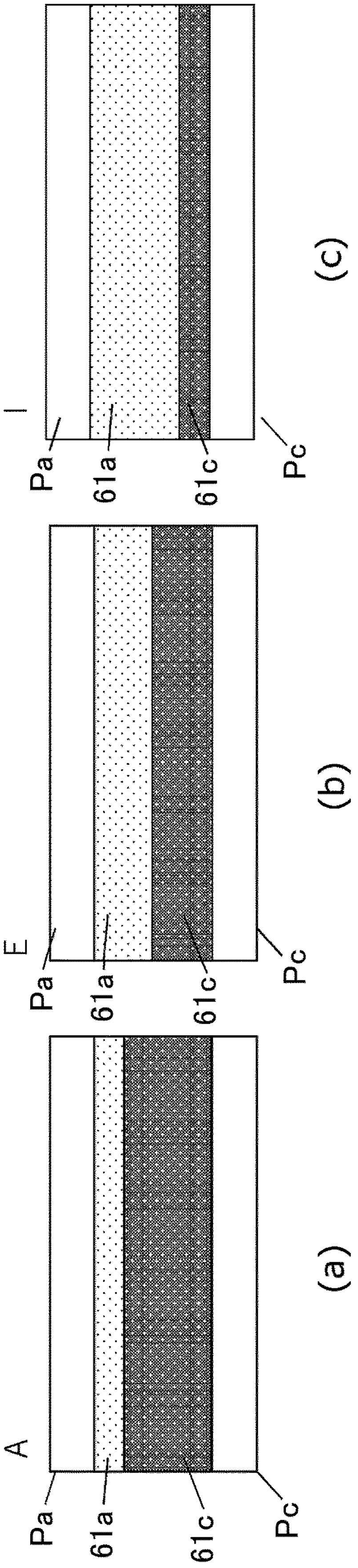

Parts (a) to (c) of FIG. 10 are schematic views each showing a sheet bonding cross section in the embodiment 1.

Figure 11:
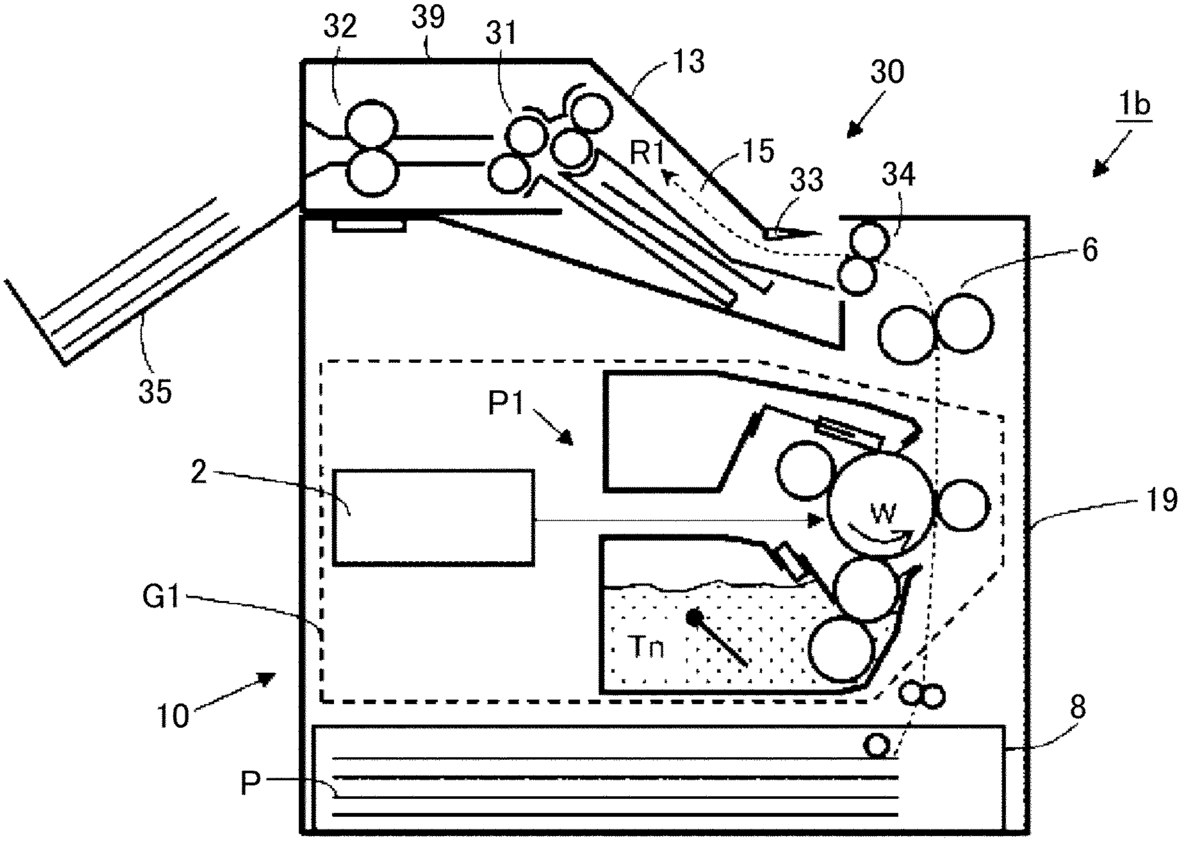

FIG. 11 is a schematic view of the sheet bonding apparatus using the powdery adhesive in the embodiment 1.

Figure 12:
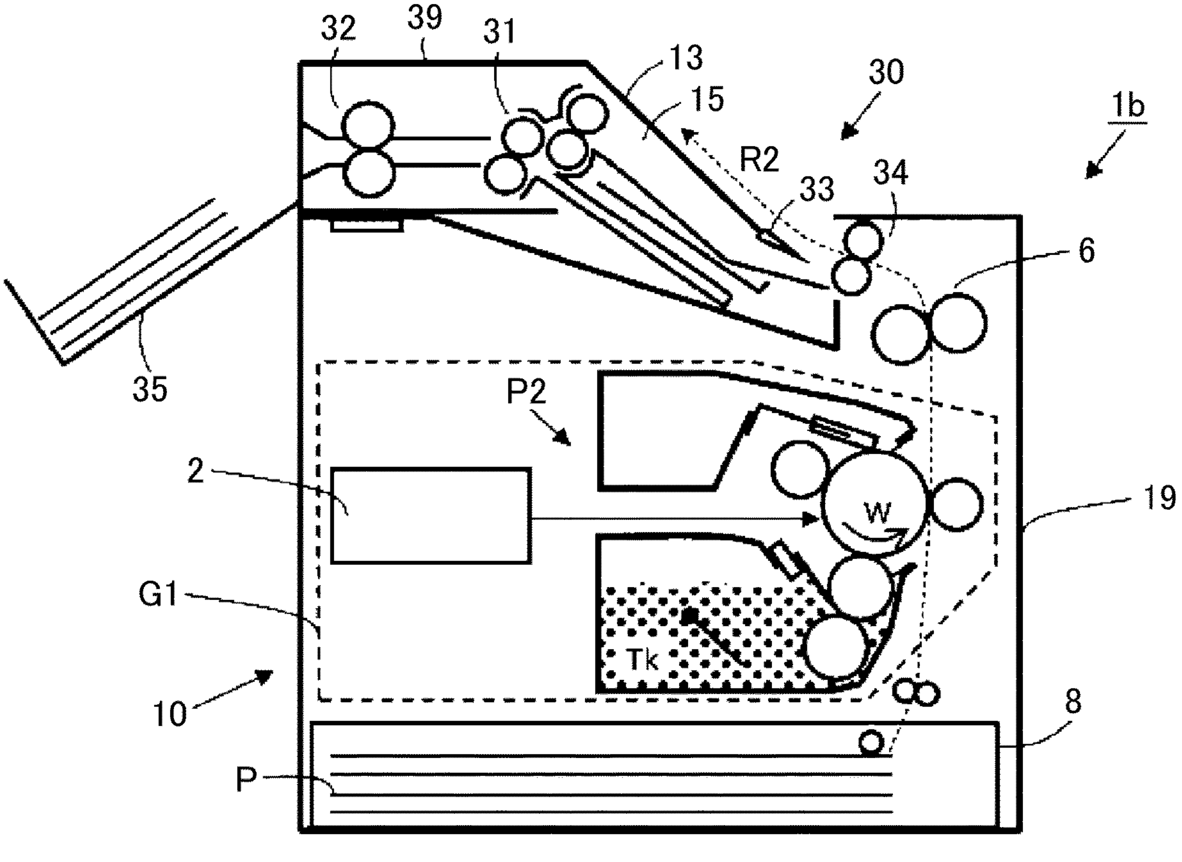

FIG. 12 is a schematic view of an image forming apparatus using printing toner in the embodiment 1.

Figure 13:
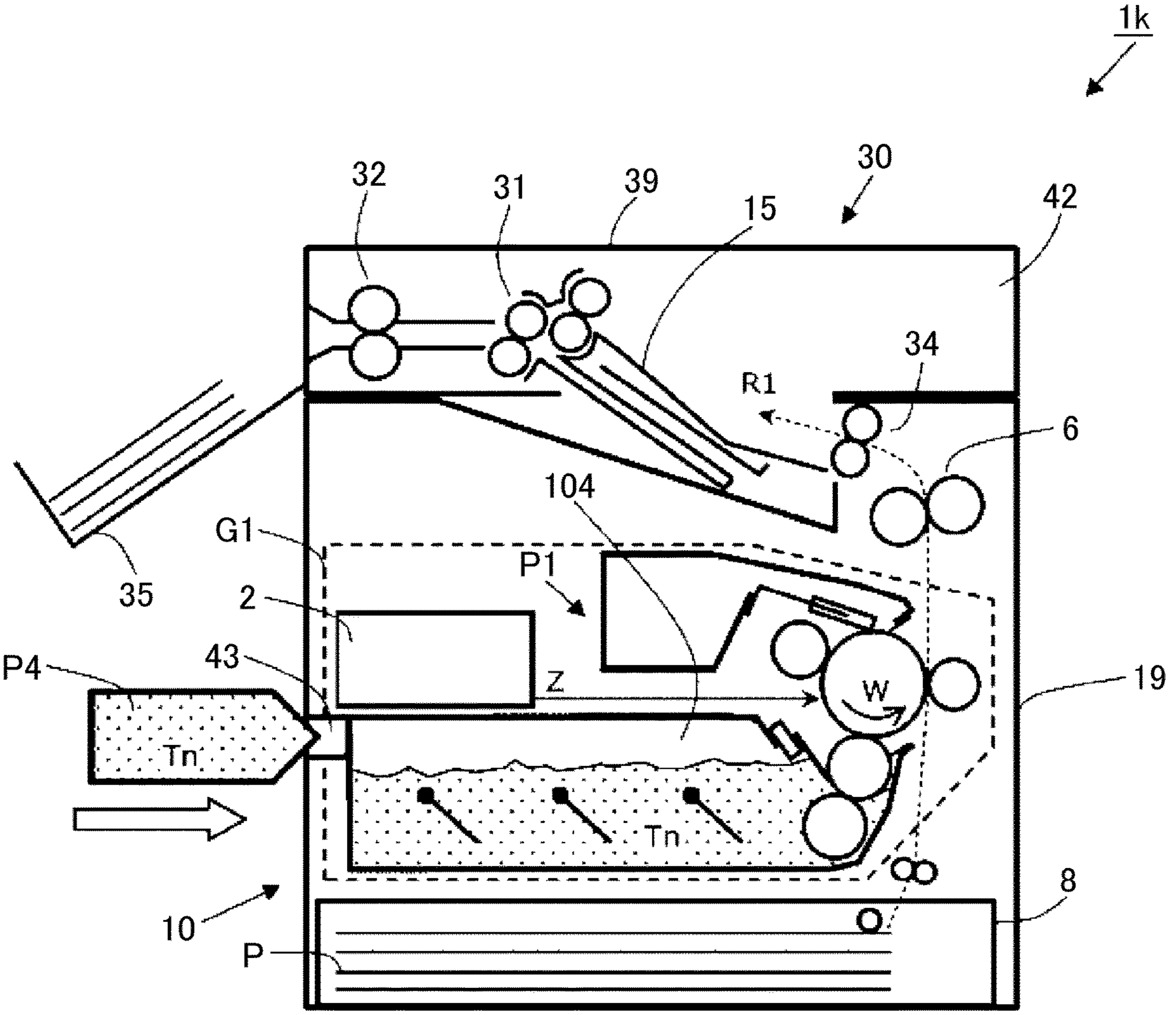

FIG. 13 is a schematic view of a sheet bonding apparatus according to another embodiment of the embodiment 1.

Figure 14:
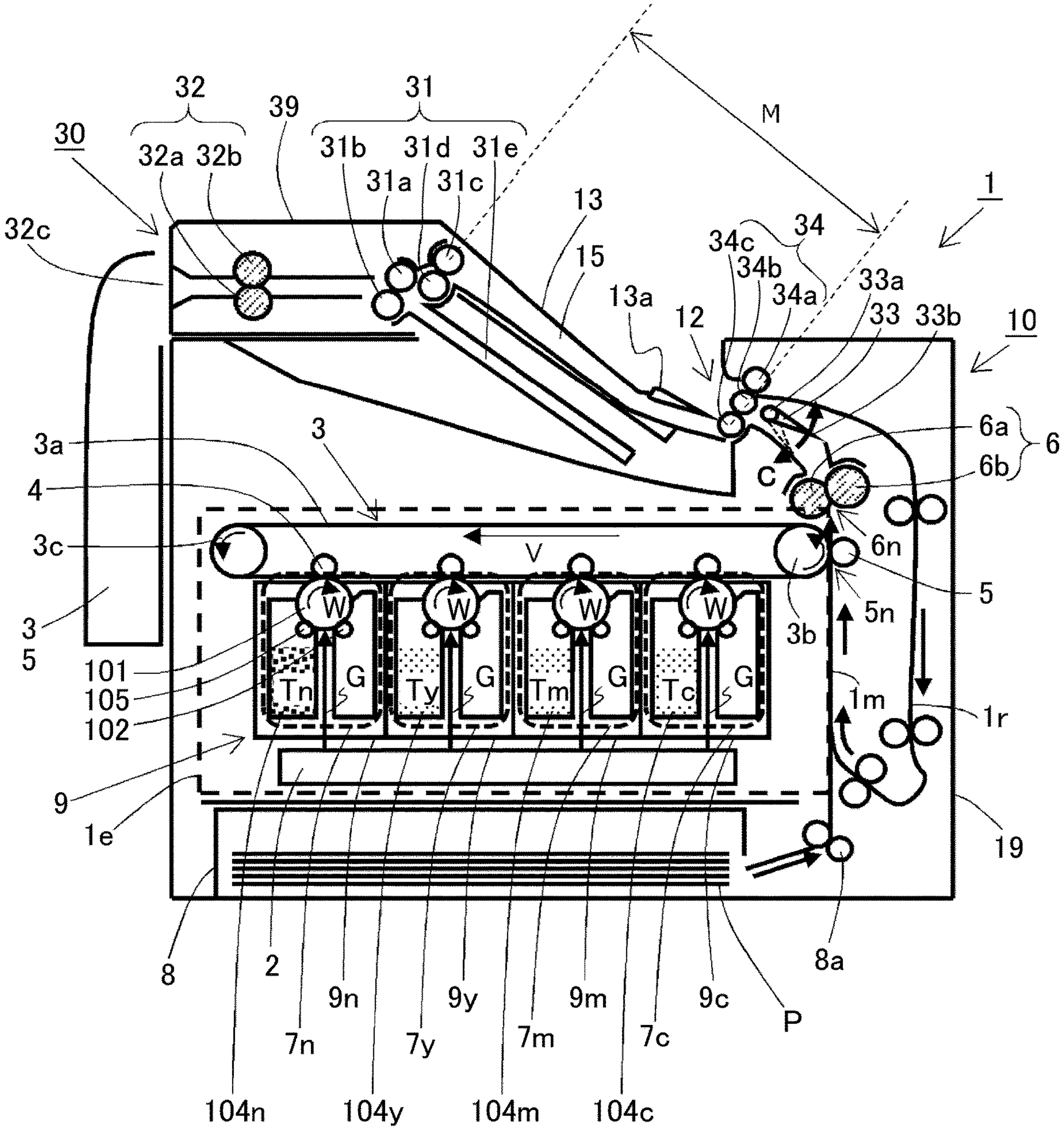

FIG. 14 is a schematic view of a sheet bonding apparatus according to another embodiment of the embodiment 1.

Figure 15:
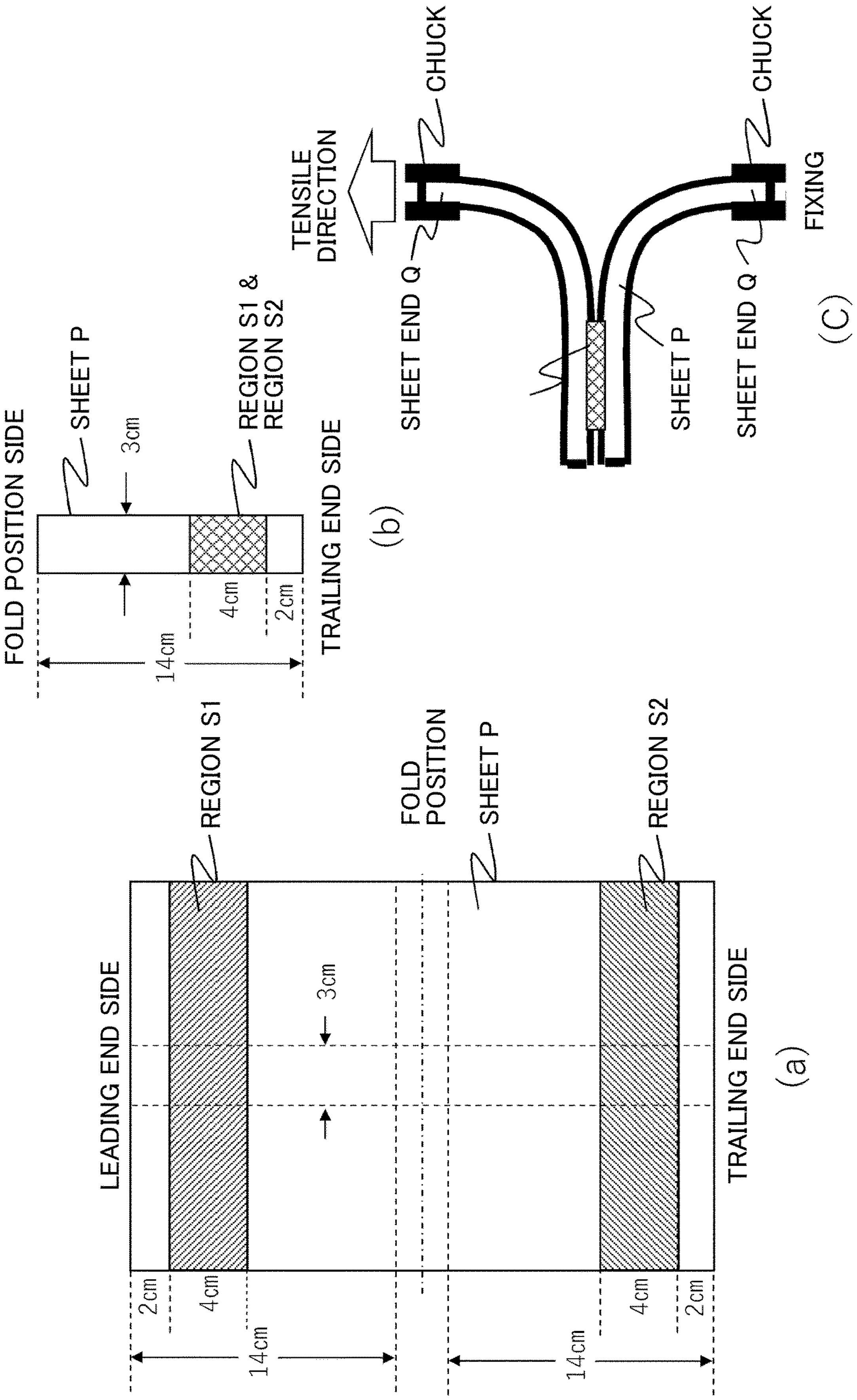

Parts (a) to (c) of FIG. 15 are schematic views for illustrating a tensile test method in an embodiment 2.

Figure 16:
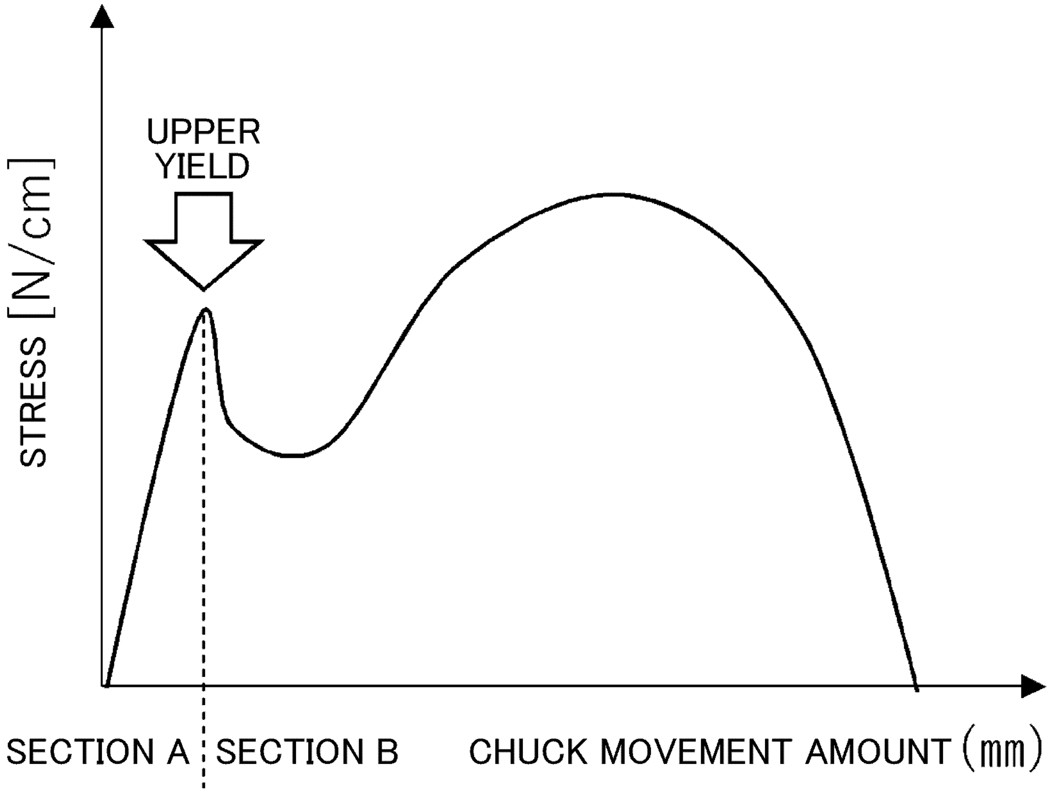

FIG. 16 is a stress-yield curve graph acquired by a tensile test in the embodiment 2.

Figure 17:
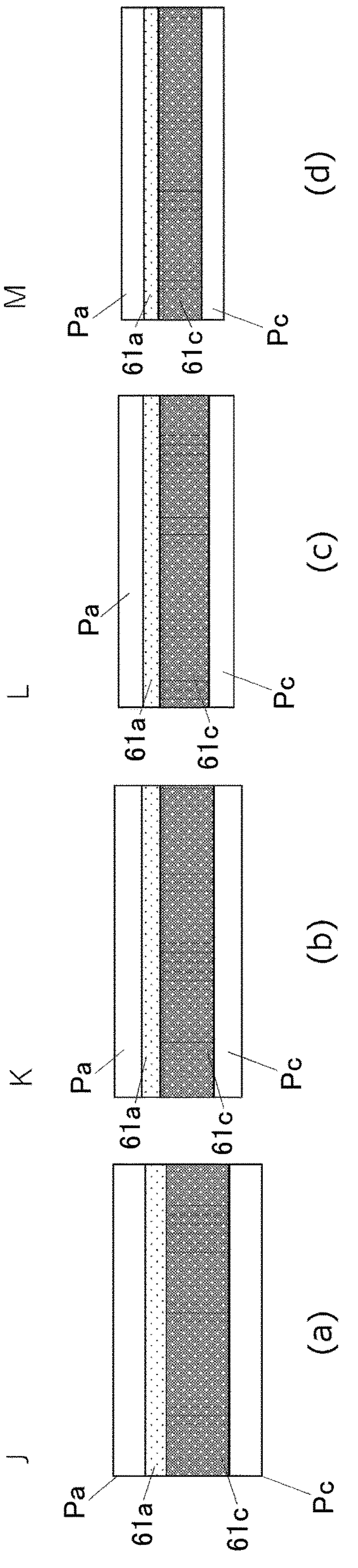

Parts (a) to (d) of FIG. 17 are schematic views each showing a sheet bonding cross-section in the embodiment 2.

DESCRIPTION OF THE EMBODIMENTS

In the following preferred embodiments of the present invention will be described illustratively and specifically with reference to the drawings. However, as regards materials, shapes, a relative arrangement, and the like of constituent parts described in the following embodiments, a scope of the present invention is not intended to be limited to the following embodiments unless otherwise specified.

Further, in the following description, as regards materials, shapes, and the like of members once described, also in later description, materials, shapes, and the like of the members are similar to those once described unless otherwise specified.

Embodiment 1

(General Structure of Apparatus)

First, a general structure of a sheet bonding apparatus 1*a* according to an embodiment 1 will be described using FIG.

Figure 1:
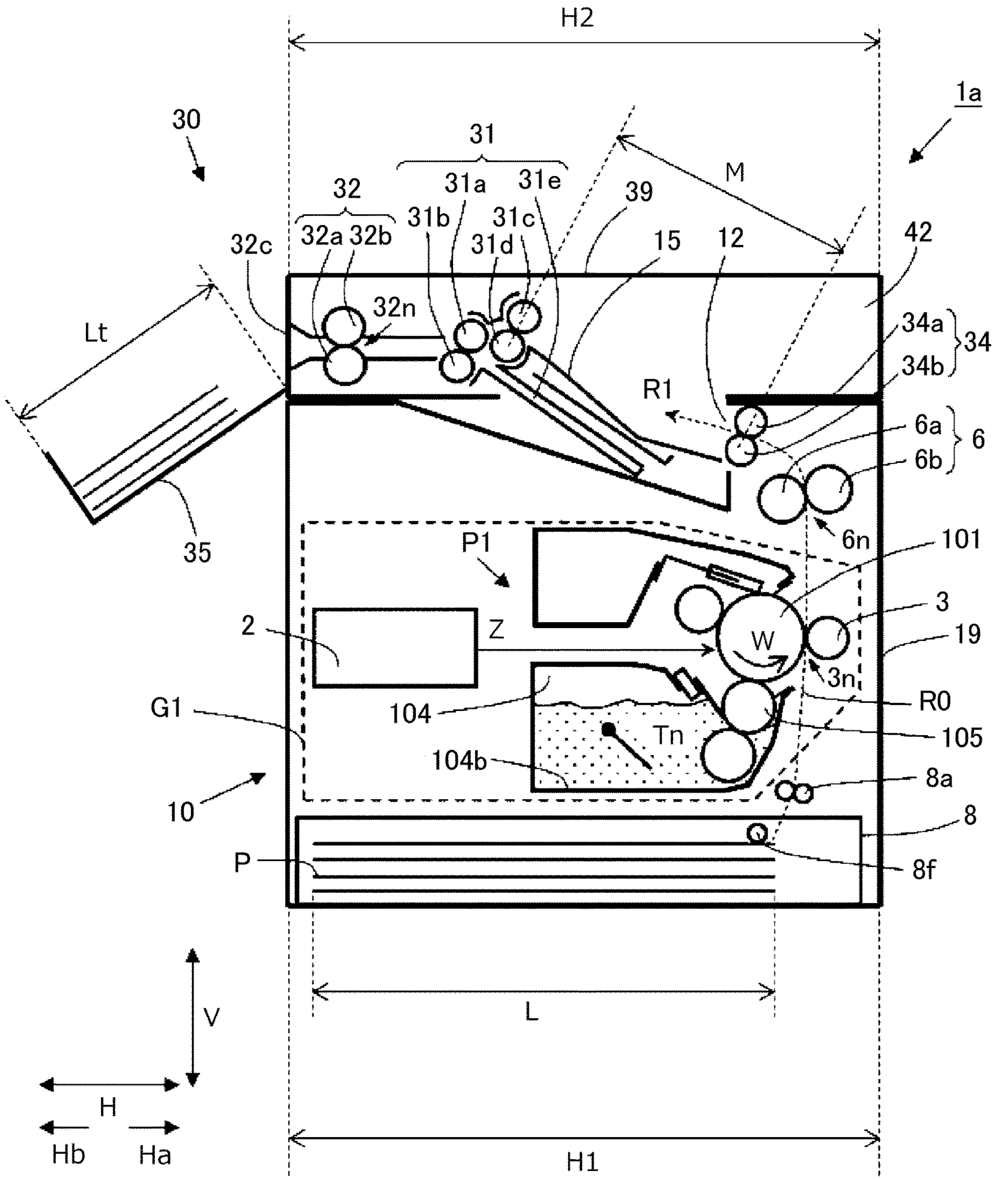
FIG. 1 is a schematic view of a sheet bonding apparatus according to an embodiment 1.

1. FIG. 1 is a schematic view showing the sheet bonding apparatus 1a including a cross-sectional constitution of a sheet bonding apparatus main assembly (hereinafter, referred to as an "apparatus main assembly") 10 in the embodiment 1, and a post-processing unit 30 connected to the apparatus main assembly 10. The sheet bonding apparatus 1a is constituted by the apparatus main assembly 10 provided with a powdery adhesive applying mechanism of an electrophotographic type and by the post-processing unit 30 as a sheet processing apparatus. As described in the following, the apparatus main assembly 10 has a constitution similar to a constitution of an image forming apparatus of an electrophotographic type except that a powdery adhesive is used as a developer.

First, an inside constitution of the apparatus main assembly 10 will be described. As shown in FIG. 1, the apparatus main assembly 10 includes a sheet cassette 8 as a sheet accommodating portion for accommodating sheets P subjected to bonding, an electrophotographic unit G1 (applying means) for applying the powdery adhesive onto the sheet P, a fixing device 6 as a fixing means (first heating device), and a casing 19 for accommodating these members. The apparatus main assembly 10 has a function such that a powdery adhesive Tn is applied onto the sheet P, fed from the sheet cassette 8, by an electrophotographic unit G1 and then a fixing process for fixing the powdery adhesive Tn on the sheet P by a fixing device 6 is performed. Here, as the sheet P, pre-print paper on which information is printed in advance by various printing types, such as an electrophotographic type, an ink jet type, and offset printing (hereinafter, this sheet is referred to as "pre-print paper") is set. The sheet bonding apparatus 1a of this embodiment is an apparatus for preparing a product obtained by applying only the powdery adhesive Tn onto the pre-print paper and then by bonding the pre-print poor, and can also be called a pressure-bonding apparatus or a sheet processing apparatus.

The sheet cassette 8 is inserted into the casing 19 in a pullable manner at a lower portion of the apparatus main assembly 10, and accommodates sheets P in a large number. The sheets P accommodated in the sheet cassette 8 and fed from the sheet cassette 8 by a feeding roller 8f and are separated one by one by a separation roller pair (not shown), and the separated sheet P is conveyed by a conveying roller 8a. The feeding roller 8f is an example of a feeding member for feeding the sheet P, and for example, a feeding mechanism for feeding the sheet P by attracting (sucking) the sheet P to a surface of an endless belt provided with air vent holes through negative pressure generated by an air suction unit may be used. The separation roller pair includes a conveying roller for conveying the sheet P and a separation roller contacting the conveying roller by being supported by a fixing shaft via a torque limiter. In a nip (separation nip) between the conveying roller and the separation roller, the separation roller imparts a frictional force to the sheet P, so that sheets other than the sheet P contacting the conveying roller can be prevented from double (overlap) feeding. Incidentally, a mechanism for separating the sheet P is not limited to the separation roller, and for example, a pad-shaped friction member may be used as the separation mechanism.

The electrophotographic unit G1 is an electrophotographic mechanism including a process cartridge P1 (first cartridge), a scanner unit 2, and a transfer roller 3. The electrophotographic unit G1 functions as an adhesive applying unit for applying the powdery adhesive to the sheet P by an electrophotographic process in which the powdery adhesive is used as a developer. The process cartridge P1 is prepared by integrally assembling a plurality of parts for performing the electrophotographic process into a unit in an exchangeable manner. In the apparatus main assembly 10, a cartridge supporting portion (not shown) supported by the casing 19 is provided, so that the process cartridge P1 is detachably mounted to the apparatus main assembly 10.

The process cartridge P1 is constituted by a photosensitive member unit CC including a photosensitive drum 101 or the like as an image bearing member, a powder accommodating portion 104, and a developing unit DT including a developing roller 105 for developing an object with powder, and the like. Details thereof will be described later. Incidentally, herein, the term "development" is not limited to a process for visualizing an electrostatic latent image on the image bearing member with printing toner (chromatic toner), but is used for a process for depositing a transparent powdery adhesive Tn on the electrostatic latent image on the image bearing member. In the powder accommodating portion 104 including a bottom 104b, the powdery adhesive Tn (powdery adhesive, bonding toner) which is powder for performing bonding processing of the sheet P is accommodated.

The scanner unit 2 functions as an exposure means for writing the electrostatic latent image by irradiating the photosensitive drum 101 of the process cartridge P1 with laser light Z. The transfer roller 3 opposes the photosensitive drum 101 of the process cartridge P1 and forms a transfer nip 3n as a transfer portion in cooperation with the photosensitive drum 101. In the transfer nip 3n, the transfer roller 3 functions as a transfer means for transferring the powdery adhesive Tn from the photosensitive drum 101 onto the sheet P fed from the sheet cassette 8.

The fixing device 6 is disposed above the transfer roller 3. The fixing device 6 is a fixing equipment of a heat-fixing type including a heating roller 6a as a fixing member and a pressing roller 6b as a heating member. The heating roller 6a is heated by a heat generating member such as a halogen lamp or a ceramic heater or by a heat generating mechanism of an induction heating type. The pressing roller 6b of pressed against the heating roller 6a by an urging member such as a spring, and generates a pressing force for pressing the sheet P passing through a nip (fixing nip) 6n between the heating roller 6a and the pressing roller 6b. Incidentally, herein, a constitution in which a roller pair as a rotatable member pair nips and conveys the sheet P is illustrated, but for example, a fixing equipment of a heat film type may be used as the fixing device 6. The fixing equipment of the heat film type is a device which includes a cylindrical film provided with a heater including a heat generating resistor on an inside thereof and a pressing roller press-contacted to the heater via the film and which is for conveying the sheet in a nip between the pressing roller and the film.

The casing 19 is provided a discharge opening 12 which is an opening for permitting discharge of the sheet P from the apparatus main assembly 10, and at the discharge opening 12, a discharging unit 34 is provided. The discharging unit 34 which is a discharging means in this embodiment includes a first discharging roller 34a and a second discharging roller 34b.

Further, in the apparatus main assembly 10, a feeding path passing through the conveying roller 8a, the transfer nip 3n, and the fixing nip 6n constitutes a main conveying passage R0 along which above-described (transfer) of the powdery adhesive Tn onto the sheet P is performed. The main conveying passage R0 passes through one side of the electrophotographic unit G1 with respect to a horizontal direction H and extends from below to above in the case where the main conveying passage R0 is viewed from a main scan direction in the electrophotographic process. Here, the main scan direction refers to a rotational axis direction of the photosensitive drum 101 and is also a sheet width direction perpendicular to a conveying direction of the sheet P conveyed along the main conveying passage R0. In other words, the apparatus main assembly in this embodiment is an electrophotographic apparatus of a so-called vertical conveying type (vertical path type) in which the main conveying passage R0 extends in a substantially vertical direction V. Incidentally, as viewed in the vertical direction V, an intermediary path 15 (described specifically later) and the sheet cassette 8 at least partially overlap with each other. For that reason, with respect to the horizontal direction H, a movement direction (Hb) of the sheet P when the discharging unit 34 discharges the sheet P is opposite to a movement direction (Ha) of the sheet P when the sheet P is fed from the sheet cassette 8.

(Post-Processing Unit)

As shown in FIG. 1, a post-processing unit 30 is mounted on an upper portion of the apparatus main assembly 10.

The post-processing unit 30 is prepared by integrally accommodating a folding device 31 as a folding means and a bonding device 32 as a bonding means into a unit in the casing 39. Further, the post-processing unit 30 is provided with the intermediary path 15 and a first discharge tray 35. Functions of respective portions provided in the post-processing unit 30 will be described later.

Further, in this embodiment, the powdery adhesive Tn applied by the electrophotographic unit G1 is fixed (temporarily fixed) on the sheet by the fixing device 6 as a first heating device, and thereafter the sheet is bonded by the bonding device 32 as a second heating device other than the first heating device. Further, in this embodiment, a width H2 of the post-processing unit 30 with respect to the horizontal direction is substantially equal to a width H1 of the apparatus main assembly 10 with respect to the horizontal direction.

Figure 2:
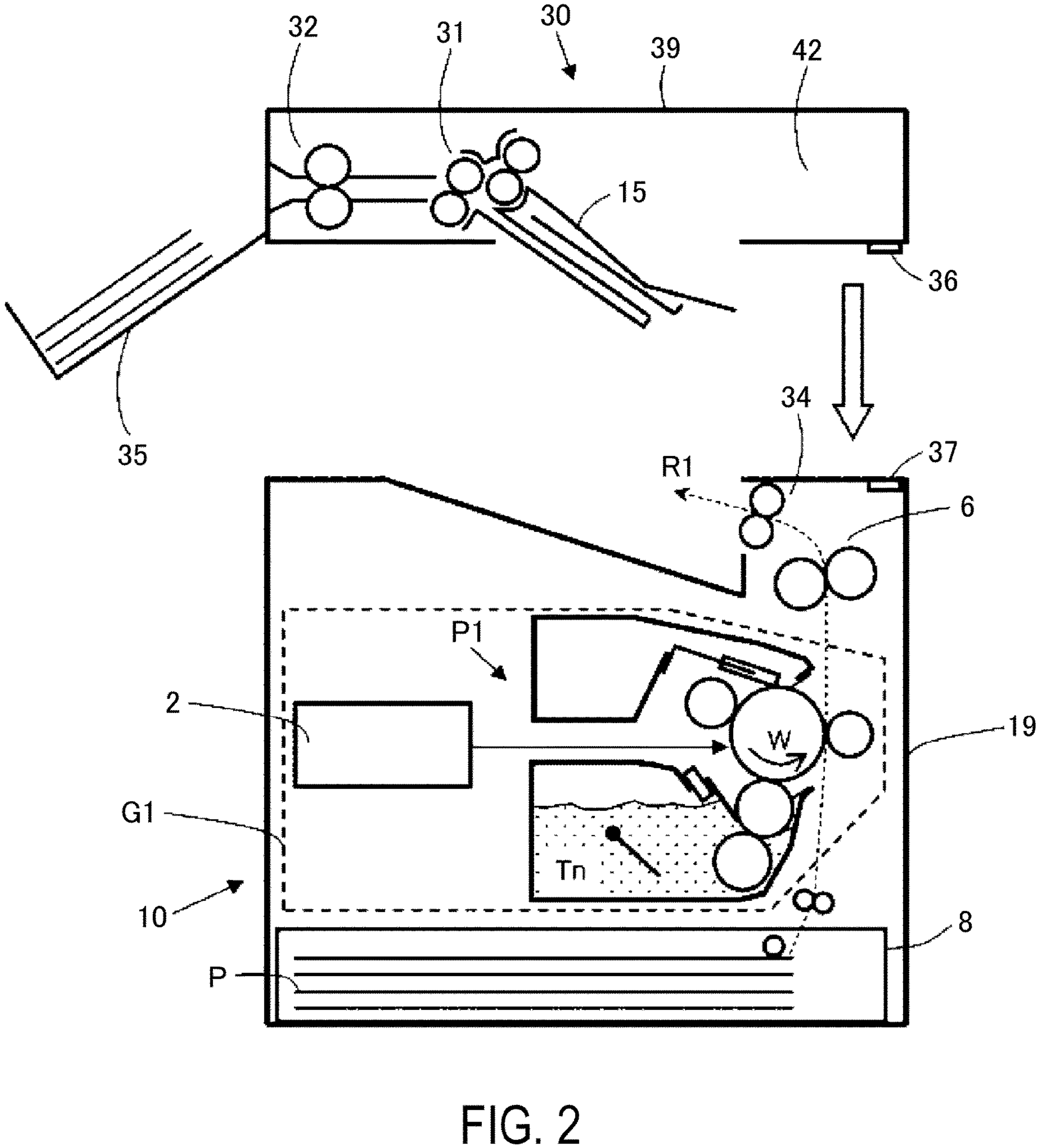
FIG. 2 is a schematic view for illustrating mounting of a post-processing unit in the embodiment 1.

Further, FIG. 2 is a schematic view for illustrating mounting of the post-processing unit 30 to the apparatus main assembly 10 of the sheet bonding apparatus 1*a*. As shown in FIG. 2, the post-processing unit 30 is provided with a positioning portion (not shown, for example, a projected-shaped portion engageable with a recessed portion of the casing 19) for positioning a casing 39 to the casing 19 of the apparatus main assembly 10. Further, the post-processing unit 30 is provided with a driving source (not shown) and a controller (not shown) other than those for the apparatus main assembly 10, and a connector 36 of the post-processing unit 30 and a connector 37 of the apparatus main assembly 10 are connected with each other, so that the post-processing unit is electrically connected with the apparatus main assembly 10. By this, the post-processing unit 30 is in a state in which the post-processing unit 30 is operated on the basis of an instruction from the controller provided in the apparatus main assembly 10, by using electric power supplied via the apparatus main assembly 10.

(Process Cartridge)

Figure 3:
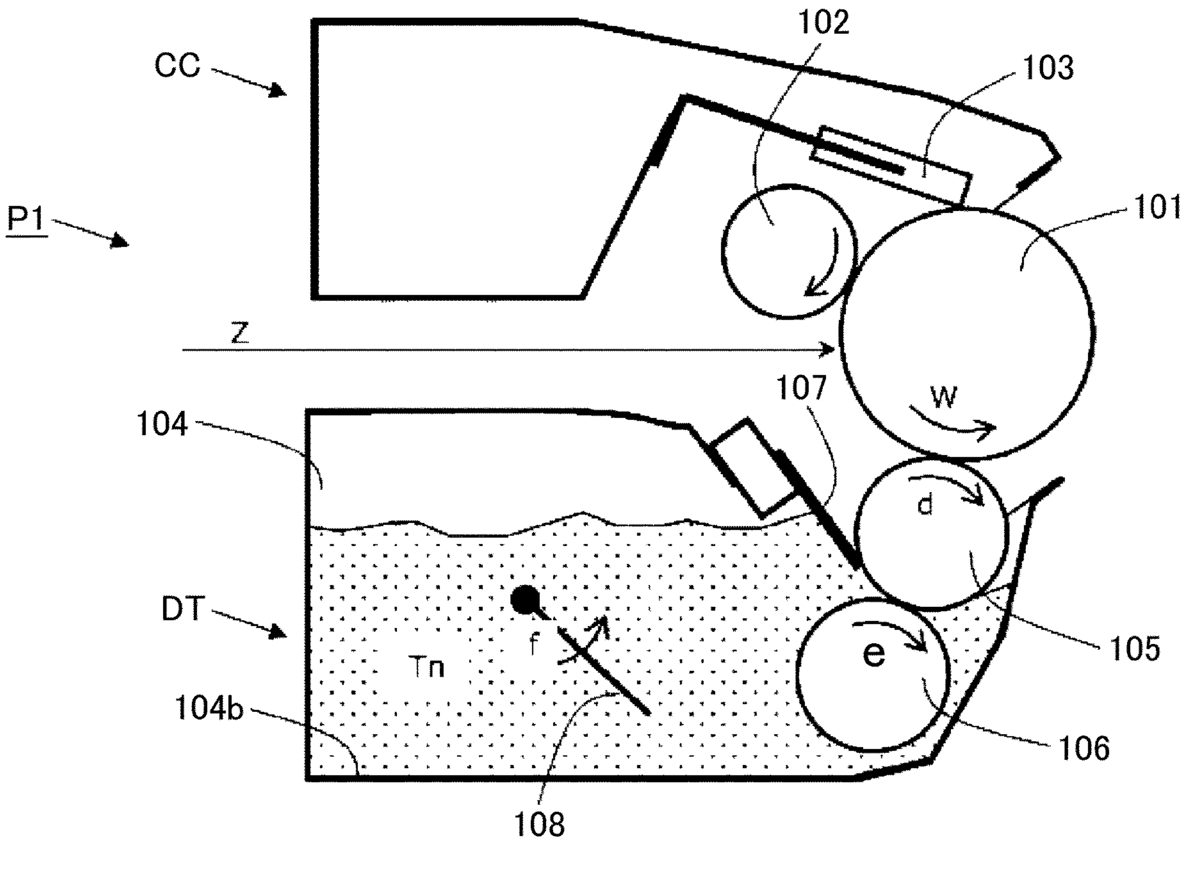
FIG. 3 is a schematic view of a process cartridge for an adhesive in the embodiment 1.

Details of the process cartridge P1 will be described. FIG. 3 is a sectional view showing a schematic constitution of the process cartridge P1. The process cartridge P1 is constituted by the photosensitive member unit CC provided with the photosensitive drum 101 and the like and the developing unit DT provided with the developing roller 105 and the like.

To the photosensitive member unit CC, via an unshown bearing, the photosensitive drum 101 which is an electrophotographic photosensitive member molded in a drum shape is rotatably mounted. Further, the photosensitive drum 101 is rotationally driven in the counterclockwise direction (arrow w) in FIG. 3 during execution of the electrophotographic process by receiving a driving force of a motor as an unshown driving means (driving source) provided in the apparatus main assembly 10. Further, in the photosensitive member unit CC, at a periphery of the photosensitive drum 101, a charging roller 102 as a charging means for electrically charging the photosensitive drum 101 and a cleaning member 103 as a cleaning means for cleaning the surface of the photosensitive drum 101 are provided.

In the developing unit DT, the developing roller 105 as a developer carrying member rotating in the clockwise direction (arrow d) in FIG. 3 in contact with the photosensitive drum 101 is provided. The developing roller 105 and the photosensitive drum 101 rotate so that surfaces thereof move in the same direction in an opposing portion (contact portion). The developing roller 105 functions as a developing means for developing the electrostatic latent image on the photosensitive drum 101 with use of the powdery adhesive Tn which is the developer.

Further, in the developing unit DT, a developer supplying roller (hereinafter, simply referred to as a "supplying roller") 106 as a developer supplying member rotating in the clockwise direction (arrow e) in FIG. 3 is provided. The supplying roller 106 and the developing roller 105 rotates so that surfaces thereof move in opposite directions in an opposing portion (contact portion). The supplying roller 106 supplies the powdery adhesive Tn onto the developing roller 105. At the same time, the supplying roller 106 performs action of peeling the powdery adhesive Tn, remaining on the developing roller 105, from the developing roller 105. Further, the developing unit DT is provided with a developing blade 107 as a developer regulating member for regulating a layer thickness of the powdery adhesive Tn supplied onto the developing roller 105 by the supplying roller 106.

In the powder accommodating portion 104, the powdery adhesive Tn is accommodated as powder. Further, in the powder accommodating portion 104, a conveying member 108 which is rotatably supported is provided. The conveying member 108 not only stirs the powdery adhesive Tn, accommodated in the powder accommodating portion 104 but also conveys the powdery adhesive Tn toward the developing roller 105 and the supplying roller 106, by being rotated in the counterclockwise direction (arrow f) in FIG. 3.

Here, the photosensitive member unit CC and the developing unit DT can also be separated constituted as a photosensitive member unit cartridge and a developing unit cartridge, respectively, so as to be detachably mountable to the apparatus main assembly 10. Further, separated from the process cartridge including the photosensitive member and the developer carrying member, a powder cartridge which only includes the power accommodating portion 104 and the conveying member 108 and which is detachably mountable to the apparatus main assembly 10 can also be constituted.

Figure 4:
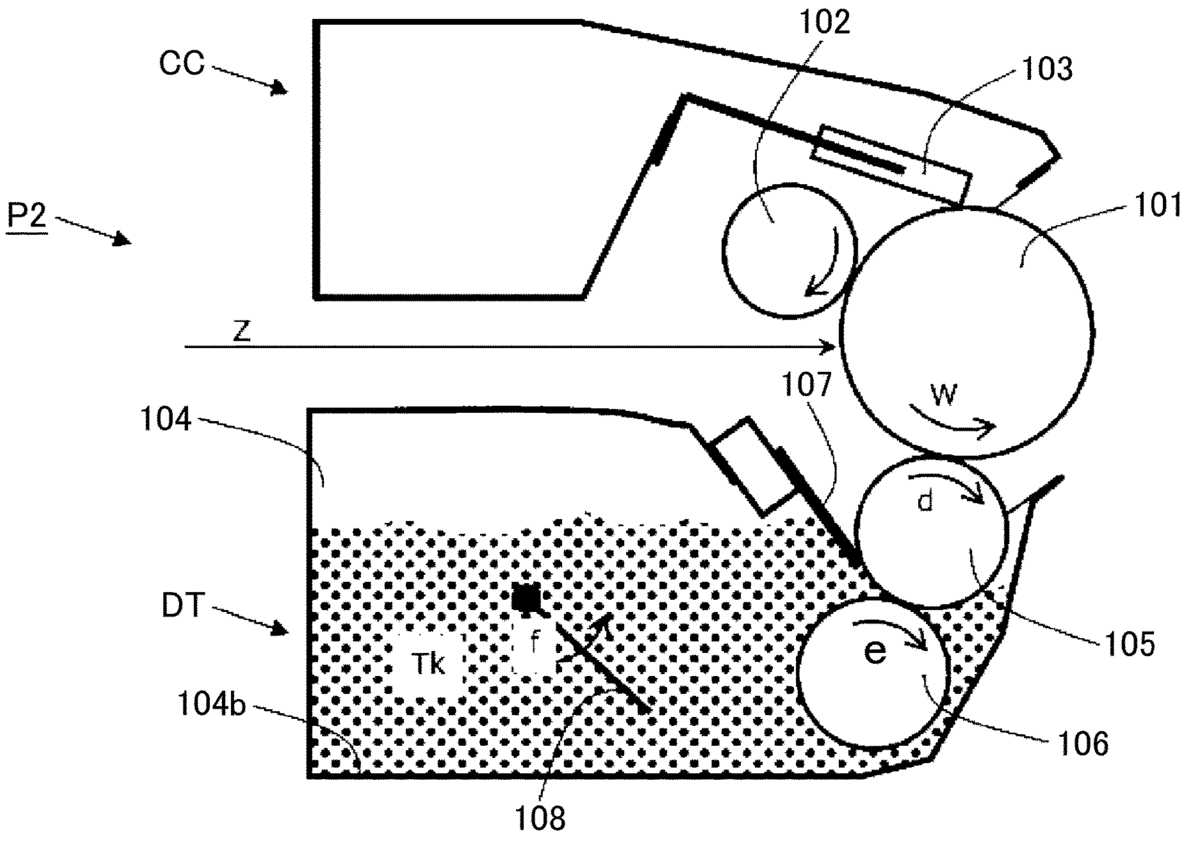
FIG. 4 is a schematic view of a process cartridge for toner in the embodiment 1.

Incidentally, FIG. 4 shows a process cartridge P2 (second cartridge) in which printing toner Tk is accommodated. The process cartridge P2 is different from the process cartridge P1 in that the printing toner Tk is accommodated in place of the powdery adhesive Tn, and other constitutions of the process cartridge P2 are similar to those of the process cartridge P1. The sheet bonding apparatus 1*a* is switchable between a first state in which application of the powdery adhesive Tn and bonding of the sheet can be performed with use of the process cartridge P1 (first cartridge) and a second state in which image formation with the printing toner Tk can be carried out with use of the process cartridge P2 (second cartridge).

The sheet bonding apparatus 1*a* in a state in which the process cartridge P2 is provided can be regarded as an image forming apparatus including an image forming unit (image forming means).

(Powdery Adhesive)

As the powdery adhesive Tn in this embodiment, it is possible to use powder containing thermoplastic resin. The thermoplastic resin is not particularly limited, and it is possible to cite known thermoplastic resins such as polyester resin, vinyl resins, acrylic resins, styrene-acrylic resins, polyethylene, polypropylene, polyolefin, ethylene-vinyl acetate copolymer (resin), and ethylene-acrylic acid copolymer (resin). These resins may also be contained in a plurality of species.

Further, the powdery adhesive Tn may further contain a wax. As the wax, it is possible to use known waxes including an ester wax which is an ester of an alcohol with an acid, hydrocarbon wax such as a paraffin wax, and the like.

Further, the powdery adhesive Tn may contain a colorant. As this colorant, it is possible to use known colorant such as colorants for black, yellow, magenta, and cyan, and the like colorant. A content of the colorant in the powdery adhesive may preferably be 1.0 wt. % or less, further preferably be 0.1 wt. % or less. In addition, the powdery adhesive Tn may contain a magnetic material, a charge control agent, and an external additive.

In order to form a bonding region (bonding portion) with the powdery adhesive Tn on the sheet P, a weight-average particle size of the powdery adhesive Tn may preferably be 5.0 μm or more and 20 μm or less, more preferably be 6.0 μm or more and 20 μm or less. Incidentally, when an adhesive (bonding) property is satisfied, as the powdery adhesive Tn, printing toner (toner for printing) may be used.

(Manufacturing Example of Powdery Adhesive)

In the following, a manufacturing method of the powdery adhesive Tn will be illustrated. First, the following materials were prepared.

Styrene: 75.0 parts n-Butyl acrylate: 25.0 parts

Polyester resin: 4.0 parts (Polyester resin of 20000 in weight-average molecular weight (Mw), 75° C. in glass transition temperature (Tg), and 8.2 mgKOH/g in acid value)

Ethylene glycol distearate: 14.0 parts (Ester wax obtained by esterifying ethylene glycol with stearic acid)

Hydrocarbon max ("HNP-9", manufactured by NIPPON SEIRO CO., LTD.): 2.0 parts

Divinylbenzene: 0.5 part

A mixture of the above-described materials was warmed to 60° C. and was stirred at 500 rpm by a mixer ("T.K. HOMO MIXER", manufactured by Tokushu Kika Kogyo Co., Ltd.), and thus the mixture was uniformly dissolved, so that a polymerizable monomer composition was prepared.

On the other hand, in a container provided a high-speed stirring device ("CLEARMIX" manufactured by M Technique Co., Ltd.), 850.0 parts of 0.10 mol/L-$Na_3PO_4$ aqueous solution and 8.0 parts of hydrochloric acid were added, and the number of rotations was adjusted to 15000 rpm, and then the mixture was warmed to 70° C. To the mixture, 127.5 parts of 1.0 mol/L-$CaCl_2$) aqueous solution was added, so that an aqueous medium containing calcium phosphate was prepared.

In the above-described aqueous medium, the above-described polymerizable monomer composition was added, and thereafter, 7.0 parts of t-butyl peroxypivalate which is a polymerization initiator was added, followed by granulation (particle formation) for 10 minutes while keeping the number of rotations at 15000 rpm. Thereafter, the stirring device was changed from the high-speed stirring device to a propeller stirring blade and reaction was caused at 70° C. for 5 hours under reflux, and then a reaction temperature was increased to 85° C., followed by reaction for 2 hours.

After an end of polymerization reaction, a resultant slurry was cooled, and hydrochloric acid was added to the slurry, so that pH was changed to 1.4, followed by stirring for 1 hour, and thus calcium phosphate was dissolved. Thereafter, the slurry was washed with water in an amount which is three times the amount of the slurry and was filtered and dried, followed by classification, so that powdery adhesive particles were obtained.

Thereafter, to 100.0 parts of the powdery adhesive particles, as an external additive, 2.0 parts of silica fine particles (number-average particle size of primary particles: 10 nm, BET specific area: 170 $m^2/g$) hydrophobized with dimethyl silicone oil (20 wt. %). Then, the powdery adhesive particles to which the silica fine particles were added was mixed at 3000 rpm for 15 minutes by using a mixer ("Mitsui Henschel mixer", manufactured by Mitsui Miike Kakoki Co., Ltd.), so that a powdery adhesive Tn was obtained. The obtained powdery adhesive Tn was 6.8 μm in weight-average particle size.

(Measuring Method of Weight-Average Particle Size)

The weight-average particle size of the powdery adhesive Tn is calculated in the following manner. As a measuring device, an accurate particle size distribution measuring device ("Coulter Counter Multisizer 3" (trade name), manufactured by Beckman Coulter, Inc.) provided with a 100 μm-aperture tube according to a pore electric resistance method is used. Setting of a measuring condition and analysis of measuring data are made using an attached dedicated software ("Beckman Coulter Multisizer 3 Version 3.51", manufactured by Beckman Coulter, Inc.). Incidentally, measurement is made using an effective measuring channel number of 25000 (channels).

As an electrolytic aqueous solution used for the measurement, for example, "ISOTON II" (manufactured by Beckman Coulter) prepared by dissolving a special-grade sodium chloride in ion exchange water so that a concentration becomes 1 wt. % can be used.

Incidentally, before the measurement and the analysis are made, setting of the dedicated software is made in the following manner. In a "CHANGE STANDARD OPERATING METHOD (SOM)" screen, a total count number of a control mode is set to 50000 particles, the number of measurement is set to once, and as a Kd value, a value obtained by using "STANDARD PARTICLES 10.0 μm" (manufactured by Beckman Coulter, Inc.) is set. By pressing a "THRESHOLD/NOISE LEVEL MEASURING BUTTON", a threshold and a noise level are automatically set. Then, a current is set to 1600 μA, again is set to 2, the electrolytic solution is set to "ISOTON II", and an item "FLUSH APERTURE TUBE AFTER MEASUREMENT" is checked. In a "CONVERSION SETTING FROM PULSE INTO PARTICLE SIZE" of the dedicated software, a bin interval is set to a logarithmic particle size, a particle size bin is set to 256 particle size bins, and a particle size range is set to 2 μm to 60 μm. A specific measuring method is as follows.

(1) In a 250 mL-round-bottom glass beaker dedicated to the Multisizer 3, 200 mL of the electrolytic aqueous solution is put, and the beaker is set on a sample stand, followed by stirring of a stirrer rod at 24 rps in the counterclockwise direction. Then, by an "aperture tube flush" function, a contamination and air bubbles in the aperture tube are removed in advance.

(2) In a 100 mL-flat-bottom glass beaker, 30 mL of the electrolytic aqueous solution is put. In this solution, 0.3 mL of a dilute liquid obtained by diluting a dispersing agent ("Contaminon N", 10 wt. %-aqueous solution of a neutral detergent, for washing precision measurement instruments, of pH 7 comprising a nonionic surfactant, an anionic surfactant, and an organic builder; manufactured by Wako Pure Chemical Industries, Ltd.) is added.

(3) An ultrasonic dispersing device ("Ultrasonic Dispersion System Tetora 150", manufactured by Nikkaki Bias Co., Ltd.) in which two oscillators (oscillation frequency=50 kHz) are incorporated in a state that phases are shifted by 180 degrees and in which an electrical output is 120 W is prepared. In a water tank of the ultrasonic dispersing device, 3.3 L of ion exchange water is put, and then 2 mL of the dispersing agent ("Contaminon N") is added into the water tank.

(4) The beaker of the (2) is set in a beaker fixing hole of the ultrasonic dispersing device, and then the ultrasonic dispersing device is actuated. Then, a height position of the beaker is adjusted so that a resonance condition of a liquid surface of the electrolytic aqueous solution in the beaker becomes maximum.

(5) In a state in which the electrolytic aqueous solution in the beaker is irradiated with ultrasonic wave, the powdery adhesive Tn is added little by little to the electrolytic aqueous solution so as to become 10 mg, and then is dispersed. Then, the ultrasonic dispersion (treatment) is continued for additional 60 seconds. Incidentally, during the ultrasonic dispersion, a water temperature of the water tank is appropriately controlled to 10° C. or more and 40° C. or less.

(6) To the round-bottom beaker of the (1) set in the sample stand, the electrolytic aqueous solution of the (5) in which the powdery adhesive Tn is dispersed is added dropwise with a pipette to prepare a measurement sample so as to have a measurement concentration of 5%. Then, measurement is performed until the number of measured particles becomes 50000 (particles).

(7) Measurement data are analyzed with the dedicated software attached to the measuring device, and then a weight-average particle size is calculated.

(Sheet Bonding Operation)

Next, a sheet bonding operation performed by the sheet bonding apparatus 1_a_ of this embodiment will be described using FIG. 1, FIG. 3, parts (a) to (f) of FIG. 5, and parts (a) to (c) of FIG. 6. Parts (a) to (f) of FIG. 5 are schematic views for illustrating contents of a folding step. Parts (a) to (c) of FIG. 6 are schematic views each illustrating a bonding product outputted by the sheet bonding apparatus 1_a_.

When a product such as a pressure-bonding postcard or a pay slip is prepared using the sheet bonding apparatus 1_a_ of this embodiment, first, pre-print paper on which information is printed in advance is set as the sheet P in the sheet cassette 8. At this time, the pre-print paper is set so that a surface thereof which is a bonding (adhesive surface) surface is directed upward (above the apparatus).

First, from an external personal computer or the like, data of an application pattern of the powdery adhesive Tn to be printed and an execution instruction of the sheet bonding operation are inputted to the sheet bonding apparatus 1_a_. A controller of the sheet bonding apparatus 1_a_ starts a series of operations (sheet bonding operation) in which the powdery adhesive Tn is applied onto the sheet P in a designated application pattern while conveying the sheet P and then the sheet P is subjected to folding (processing) and bonding (processing) by the post-processing unit 30. In the sheet bonding operation, first, as shown in FIG. 1, the sheet P is fed one by one from the sheet cassette 8 and then is conveyed toward the transfer nip 3_n_ via the conveying roller 8_a_.

In parallel to the feeding of the sheet P, the photosensitive drum 101 of the process cartridge P1 is rotationally driven in the counterclockwise direction (arrow w). The surface of the photosensitive drum 101 is electrically charged uniformly by the charging roller 102. Further, the surface of the photosensitive drum 101 of the process cartridge P1 is irradiated by the scanner unit 2 with the laser light Z based on the application pattern, so that the electrostatic latent image is formed on the surface of the photosensitive drum 101. Here, a surface potential of the photosensitive drum 101 when the photosensitive drum surface is charged uniformly by the charging roller 102 is a charge potential. A region on the photosensitive drum 101 exposed to light by the scanner unit 2 has an exposure potential. The scanner unit 2 may also be capable of controlling a toner density or a powdery adhesive density for each region on the photosensitive drum 101 by controlling the exposure potential through control of the laser light Z.

Next, by the powdery adhesive Tn carried on the developing roller 105 of the process cartridge P1, the electrostatic latent image on the photosensitive drum 101 is developed into an image of the powdery adhesive Tn. That is, the powdery adhesive Tn is deposited on the region of the photosensitive drum 101 corresponding to the application pattern when the powdery adhesive Tn is applied onto the sheet P.

The powdery adhesive Tn image formed on the photosensitive drum 1 is transferred onto the sheet P in the transfer nip 3_n_ between the photosensitive drum 101 and the transfer roller 3. By this, the powdery adhesive Tn is applied (transferred) onto the sheet P by the electrophotographic unit G1.

Thereafter, the sheet P is conveyed to the fixing device 6 and is subjected to heat-fixing (treatment). That is, the powdery adhesive Tn is melted by being heated and pressed on the sheet P when the sheet P passes through the fixing nip 6_n_, and then is stuck on the sheet P, so that the powdery adhesive Tn is fixed on the pre-print surface of the sheet P. The fixing of the powdery adhesive Tn refers to that particles of the powdery adhesive Tn carried on the sheet P by an electrostatic force after the transfer are melted by heating and pressing and then are stuck, and thus are not readily peeled from the surface of the sheet P even when are subjected to an external mechanical force.

The sheet P discharged from the apparatus main assembly 10 is nipped by the first discharging roller 34_a_ and the second discharging roller 34_b_, and is conveyed to the first passage R1 through the discharge opening 12.

In the first passage R1, between the fixing device 6 and the folding device 31, the intermediary path 15 is provided. The intermediary path 15 is a sheet conveying passage positioned at an intermediary part between the apparatus main assembly 10 and the post-processing unit 30. Incidentally, the intermediary path 15 is inclined upward, with respect to the vertical direction V, toward the folding device 31 relative to the horizontal direction H. Accordingly, a first guide roller 31_c_ and a second guide roller 31_d_ which constitute an entrance of the folding device 31 are positioned above with respect to the vertical direction than the first discharging roller 34*a* and the second discharging roller 34*b* which constitute an exit of the apparatus main assembly 10.

The folding device 31 includes four rollers consisting of the first guide roller 31*c*, the second guide roller 31*d*, a first folding roller 31*a*, and a second folding roller 31*b*, and includes a drawing portion 31*e*.

The first guide roller 31*c* and the second guide roller 31*d* are a guide roller pair for nipping and conveying the sheet P received from a conveying path (intermediary path 15 in this embodiment) on an upstream side of the folding device 31. The first folding roller 31*a* and the second folding roller 31*b* are a folding roller pair for feeding the sheet P while folding the sheet P.

Incidentally, an interval M from the first discharging roller 34*a* to the first guide roller 31*c* with respect to the conveying direction (feeding direction) of the sheet P along the first passage R1 is constituted so as to be shorter than a full length L of the sheet P with respect to the conveying direction before the folding. In other words, by the interval M from the first discharging roller 34*a* to the first guide roller 31*c*, a lower limit of a length of the sheet P with respect to the conveying direction in which the sheet P can be processed by the post-processing unit 30 is determined. By this constitution, the sheet P is delivered from the discharging unit 34 to the guide roller pair without stagnation.

Parts (a) to (f) of FIG. 5 shows steps of the folding of the sheet P by the folding device 31. In the folding device 31, by performing the folding, the surface of the sheet P on which the powdery adhesive Tn is applied is positioned inside (becomes folded opposing surfaces).

In the case where the folding is executed, as shown in part (a) of FIG. 5, the first guide roller 31*c* and the first folding roller 31*a* are rotated in the clockwise direction in the figure, and the second guide roller 31*d* and the second folding roller 31*b* are rotated in the counterclockwise direction in the figure. First, a leading end q of the sheet P sent from the discharging unit 34 is drawn into the guide roller pair (31*c*, 31*d*). The leading end q of the sheet P is contacted to the first folding roller 31*a* by being guided downward by a guide wall 31*f* as shown in part (b) of FIG. 5. Then, the leading end q is drawn by the first folding roller 31*a* and the second guide roller 31*d* which oppose each other and then contacts a wall 31*g* of the drawing portion 31*e*.

With progression of the drawing of the sheet P by the guide roller pair (31*c*, 31*d*), the leading end q moves to a rear side of the drawing portion 31*e* while sliding on the wall 31*g*. Then, the leading end q abuts against an end portion 31*h* of the drawing portion 31*e* as shown in part (c) of FIG. 5. Incidentally, the drawing portion 31*e* forms a space extending substantially parallel to the intermediary path 15 on a lower side of the intermediary path as shown in FIG. 1. Then, in a stage of part (c) of FIG. 5, the sheet P is put in a state in which the sheet P is wound around the second guide roller 31*d* and is curved in a U-shape.

When the sheet P is further drawn by the guide roller pair (31*e*, 31*d*) from a state of part (c) of FIG. 5, flexure (bending) is caused to accurate a halfway portion r as shown in part (d) of FIG. 5. Then, as shown in part (e) of FIG. 5, the halfway portion r contacts the second folding roller 31*b*, and is drawn into the nip of the folding roller pair (31*a*, 31*b*) by a frictional force received from the second folding roller 31*b*. Then, as shown in part (f) of FIG. 5, in a state in which the sheet P is folded with the halfway portion r as a fold, the sheet P is discharged with the halfway portion r as a leading end by the folding roller pair (31*a*, 31*b*).

Here, in this embodiment, a depth N (part (e) of FIG. 5) of the drawing portion 31*e*, i.e., a distance from the nip of the folding roller pair (31*a*, 31*c*) to the end portion 31*h* of the drawing portion 31*e* is set to a length which is half of the full length L of the sheet P. By this, the folding device 31 is capable of executing processing (center (middle) folding) in which the sheet P is folded in two in a half length. Incidentally, by changing the depth N of the drawing portion 31*e*, a position of the fold can be arbitrarily changed.

The above-described folding device 31 is an example of a folding means, and for example, a folding mechanism for forming a fold by pushing the sheet P into a nip of a roller pair while pressing a blade against the sheet P may be used. Further, contents of the folding is not limited to two folding, but for example, a folding mechanism for executing Z folding or three folding may also be used. Incidentally, the folding device 31 in this embodiment is constituted by the rotating rollers and the fixed drawing portion 31*e*, and therefore, it is possible to simplify a driving mechanism compared with a folding mechanism using a reciprocating blade. The folding device 31 in this embodiment may only be required to be provided with the drawing portion 31*e* having the depth N which is half of the length L of the sheet P in addition to the four rollers, and therefore, it is possible to downsize the post-processing unit.

As shown in FIG. 1, the sheet passed through the folding device 31 is conveyed to the bonding device 32. The bonding device 32 has a constitution of the heat-fixing type similar to the constitution of the heat-fixing type of the fixing device 6. That is, the bonding device 32 includes a heating roller 32*b* as a heating member and a pressing roller 32*a* as a pressing member.

The heating roller 32*b* is heated by a heat generating member such as a halogen lamp or a ceramic heater, or by a heat generating mechanism of an induction heating type. The pressing roller 32*a* is pressed against the heating roller 32*b* by an urging member such as a spring, so that a pressing force for pressing the sheet P passing through a nip (bonding nip) between the heating roller 32*b* and the pressing roller 32*a* is generated. Incidentally, in this embodiment, a constitution in which the roller pair as a rotatable member nips and conveys the sheet P was illustrated, but for example, a fixing equipment (similar to that described for the fixing device 6) of a heat film type may be used as the bonding device 32.

The sheet P folded by the folding device 31 is subjected to bonding (second heat fixing to the powdery adhesive Tn) by the bonding device 32, and thus is bonded while being kept in a folded state. That is, when the sheet P passed through a bonding nip 32*n*, the powdery adhesive Tn on the sheet P is heated and pressed again in a softened state. By that, parts of the powdery adhesive Tn on the bonding (adhesive) surface (surfaces on which the powdery adhesive Tn is applied opposing each other in the folded state) hermetically bond together. Then, the powdery adhesive Tn is cooled and solidified, so that the sheet P is connected (press-contacted) with the powdery adhesive Tn as an adhesive.

The sheet P subjected to the bonding by the bonding device 32 is discharged to a left side in FIG. 1 from a discharge opening 32*c* provided to the casing 39 of the post-processing unit 30. Then, the sheet P is accommodated on a first discharge tray 35 provided on a left-side surface of the apparatus main assembly 10. A width Lt of the first discharge tray 35 with respect to a discharging direction is wider than a width of the sheet P after the bonding. By performing the above-described operation, the powdery adhesive Tn is applied onto the sheet P, and folding and bonding are performed by the post-processing unit 30, so that a bonded product can be prepared.

(Application Position and Application Amount of Adhesive)

Incidentally, depending on the application pattern of the powdery adhesive Tn on the sheet P, a bonding region (connection position) of the folded sheet P can be changed. Parts (a) to (c) of FIG. 6 each illustrates a bonding product (output object) different in application pattern of the powdery adhesive Tn.

Parts (a) and (b) of FIG. 6 are examples of the bonding product (half-bonded product) for a purpose such that a person receiving the product opens (unseals) the product. In the case of a pressure-bonding postcard 51 of part (a) of FIG. 6, the powdery adhesive Tn is applied onto regions 51*a* and 51*c* of one surface (side) of base paper, and the paper is bonded in a state in which the paper is folded at a center fold 51*b*. In the case of a pay slip 52 of part (b) of FIG. 6, the powdery adhesive Tn is applied onto regions 52*a* and 52*b* of an outer peripheral portion of one surface of base paper, and the paper is bonded in a state in which the paper is folded at a center fold 52*b*. Part (c) of FIG. 6 shows a bag (medicine bag) 53 as an example of the bonding product (completely bonded product) for a purpose without premising that the bag is opened (unsealed). In this case, the powdery adhesive Tn is applied onto U-shaped regions 53*a* and 53*c* of a sheet, and the sheet is bonded in a state in which the sheet is folded at a fold 53*b* so that two sides other than the fold 53*b* in the folded state are connected to each other.

In this embodiment, when the pressure-bonding postcard 51 is prepared, an application amount of the powdery adhesive Tn to the regions 51*a* and 51*c* with the fold as a boundary is changed. Then, as viewed in a cross-sectional direction when the sheet P is folded, the application amount of the powdery adhesive Tn onto the region on a side closer to the opposing heating roller 32*b* in the bonding step becomes small.

Here, a relationship, which is a feature of the present invention, between the application amount of the powdery adhesive Tn and the heating roller 32*b* in the bonding will be described using parts (a) and (b) of FIG. 7 and FIGS. 8 and 9. Part (a) of FIG. 7 is a schematic view showing an application region of the powdery adhesive Tn of a pressure-bonding postcard 61. Part (b) of FIG. 7 is a schematic view of the pressure-bonding postcard 61 as viewed in the cross-sectional direction in the bonding step. FIG. 8 is a schematic view showing an outside of the pressure-bonding postcard 61. FIG. 9 is a schematic view showing the pressure-bonding postcard 61 as viewed in the cross-sectional direction in the bonding step. In the case where the pressure-bonding postcard 61 is prepared, as shown in part (a) of FIG. 7, the powdery adhesive Tn is applied onto a region 61 (first region) and a region 62 (second region). In the region 61, compared with the region 62, an amount of the powdery adhesive Tn is small, and in the cross-sectional direction, a layer thickness of the powdery adhesive Tn after passing through the first heating device is thin. As shown in part (b) of FIG. 7, in the region 61*c*, compared with the region 61*a*, the amount of the powdery adhesive Tn with respect to a thickness direction of the sheet P is large, so that a layer thickness is thick with respect to the thickness direction. Further, as shown in FIG. 8, printing toner 61*d* is pre-printed on an outside of the pressure-bonding postcard 61.

As shown in FIG. 9, the sheet P is folded at a fold 61*b* and then is bonded by the bonding device 32 in a state in which the region 61*a* and the region 61*c* oppose each other. At this time, the region 61*a* is positioned on the heating roller 32*b* side than the region 61*c* is. As a result, the heat is conducted from the heating roller 32*b* to the sheet P in an order of the printing toner 61*d*, the sheet P, the region 61*a*, and the printing toner 61*d*, and by the heat, the powdery adhesive Tn at a bonding surface 61*f* where the region 61*a* and the region 61*c* oppose and contact each other is softened and bonded, so that the region 61*a* and the region 61*c* can be connected with each other.

At this time, in the region 61*a*, compared with the region 6*k*, the application amount of the powdery adhesive Tn is made small, i.e., the layer thickness is made thin, so that heat is conducted easily to the bonding surface 61*f*, and the powdery adhesive Tn is readily softened at the bonding surface 61*f*. As a result, the region 61*a* and the region 61*c* can be bonded to each other with small heat. For that reason, the printing toner 61*d* on the outside of the pressure-bonding postcard 61 is not readily melted, so that an occurrence of print peeling can be suppressed.

A total amount of the powdery adhesive Tn in the region 61*a* and the region 61*c* is required to be a minimum application amount for ensuring a bonding force, i.e., for filling between folded sheet portions Pa and Pc. This varies depending on a paper kind or the like of the sheet P. This is because a manner of heat conduction varies depending on a thickness, a surface shape, an air ventilation amount, or the like of the paper.

In this embodiment, a total application amount of the powdery adhesive Tn was 1.0 mg/cm$^2$, a ratio of application amount between the region 61*a* and the region 61*c* was 3:7, and a surface temperature of the heating roller 32*b* in the bonding step was 200° ° C. As the sheet P, a sheet ("GF-C081", available from Canon Marketing Japan Inc.) was used.

Incidentally, although a method of changing the application amount of the powdery adhesive Tn is arbitrary, similarly as general toner density adjustment in the electrophotographic type, a method according to exposure control during formation of the electrostatic latent image is effective. For example, when an exposure potential is controlled by irradiating the photosensitive drum 1 with the laser light Z by using the scanner unit 2, e.g., in the case of negative charging, it is assumed that the potential of the developing roller 105 is −300 V. Here, for example, a developing contrast is 220 V when the surface potential of the photosensitive drum 101 in the case where the application amount is intended to be increased is −80 V, and is 180 V when the surface potential of the photosensitive drum 101 in the case where the application amount is intended to be decreased is −120 V. As a result, the application amount in the former case where the developing contrast is large can be made large. By this, with respect to the thickness direction of the sheet P, a thickness of the powdery adhesive Tn in the region 61*a* can be made smaller than the thickness of the powdery adhesive Tn in the region 61*c*.

Further, for example, by a method of controlling the number of dots as in a dither method, an exposure area may be changed between the region 61*a* and the region 61*c*. In this case, the scanner unit 2 carries out the exposure control so that the number of dots per unit area becomes smaller when a region on the photosensitive drum 101 corresponding to the region 61*a* is scanned than when a region on the photosensitive drum 101 corresponding to the region 61*c* is scanned. By this, the application amount of the powdery adhesive Tn in the region 61*a* can be made smaller than the application amount of the powdery adhesive Tn in the region 61*c*.

Here, a test in the case where a ratio of the application amount between the region 61*a* and the region 61*c* was changed was conducted. A result of an occurrence of the print peeling under each condition is shown in a table 1 below. A surface temperature of the heating roller when a target bonding force can be realized was a bonding temperature. Further, as the sheet P, the paper "GF-C081" was used. Parts (a) to (c) of FIG. 10 are schematic views showing sheets P as viewed in the cross-sectional direction during bonding under conditions A, E, and I, respectively, in the following table 1.

TABLE 1

| | CONDITION | | | | | | | | |
|---|---|---|---|---|---|---|---|---|---|
| | A | B | C | D | E | F | G | H | I |
| R*[1] (61a:61c) | 1:9 | 2:8 | 3:7 | 4:6 | 5:5 | 6:4 | 7:3 | 8:2 | 9:1 |
| BT*[2] (° C.) | 180 | 185 | 190 | 195 | 200 | 205 | 210 | 215 | 220 |
| PP*[3] | ○ | ○ | ○ | ○ | x | x | x | x | x |

*[1]"R" is the ratio.
*[2]"BT" is the bonding temperature.
*[3]"PP" is the print peeling.

The bonding temperature became higher with an increasing application amount ratio of the powdery adhesive Tn of the region 61*a* from the condition A toward the condition I. This is because when the layer thickness of the powdery adhesive Tn in the region 61*a* becomes thick, heat in a larger amount is needed for more softening the bonding surface 61*f*.

Further, from the condition E and later, the printing toner 61*d* is melted by heat of the heating roller 32*b*, so that the print peeling such that the sheet P was contaminated with the printing toner 61*d* occurred. This is because the printing toner 61*d* was softened by the heating roller 32*b* due to heat for softening the powdery adhesive Tn at the bonding surface 61*f*. That is, in order to bond between the sheets Pa and Pc, there is a need to soften the powdery adhesive Tn by conducting heat to the bonding surface 61*f*, but the heat is excessively applied, the printing toner 61*d* is softened, so that the print peeling occurs. For this reason, in order to bond between the sheets Pa and Pc while suppressing the print peeling due to the printing toner 61*d*, there is a need to soften the bonding surface 61*f* at a lower temperature.

As described above, by applying the powdery adhesive Tn so that the application amount of the opposing powdery adhesive Tn during folding bonding is made smaller on the heating roller 32*b* side during the bonding than on the opposite side, it is possible to suppress the print peeling of the print portion on the outside of the pressure-bonding postcard 61 in the bonding step.

Further, in this embodiment, the case where the pressure-bonding postcard 61 was prepared was described, but the present invention is not limited thereto and is also true in the case when a sheet P such as pre-print paper is folded, the sheet P including a print portion on an outside thereof is bonded.

Another Embodiment

In the above-described embodiment, as shown in FIG. 11, a sheet bonding apparatus in which the process cartridge P1 accommodating the powdery adhesive Tn is mounted and in which a bonding product bonded is prepared was described as the sheet bonding apparatus 1*a*. However, as shown in FIG. 12, the process cartridge P1 accommodating the powdery adhesive Tn is dismounted from the sheet bonding apparatus 1*a*, and instead thereof, a process cartridge P2 accommodating printing toner Tk is mounted, so that normal printing can also be carried out.

As the printing toner Tk, conventionally well-known printing toner can be used. Particularly, printing toner using thermoplastic resin as a binder resin is preferred. The thermoplastic resin is not particularly limited, but it is possible to use resins conventionally used as the printing toner, such as polyester resin, vinyl resin, acrylic resin, or styrene-acrylic resin. These resins may be contained in a plurality of species as the binder resin. Of these resins, the printing toner using the styrene-acrylic resin is preferred. Further, the printing toner (printing developer) may contain a colorant, a magnetic material, a charge control agent, a wax, and an external additive. In this modified embodiment, as the printing toner, the printing toner Tk for black was used.

Further, the present invention is also applicable to a sheet bonding apparatus 1*k* capable of supplying the powdery adhesive Tn from an outside as shown in FIG. 13. A casing 19 of an apparatus main assembly 10 of the sheet bonding apparatus 1*k* is provided with an external supply opening 43 opening to the outside. The external supplying opening 43 communicates with an inside space of a powder accommodating portion 104. Further, in the case where the supply of the powdery adhesive Tn is not performed, the external supplying opening 43 is covered with a structure such as a shutter. Into this external supply opening 43, a powder pack P4 which is a supply container in which the powdery adhesive Tn is filled is mounted, and then the powdery adhesive Tn in the powder pack P4 is discharged, so that only the powdery adhesive Tn is supplied to the powder accommodating portion 104. When the powdery adhesive Tn is supplied to the power accommodating portion 104, the powder pack P4 is dismounted from the sheet bonding apparatus 1*k*.

In such a constitution, the powder pack P4 is prepared and then performs a supplying operation as needed, so that even in the case where the powdery adhesive Tn is consumed in a large amount in a short period, it is possible to lower a frequency of exchange of the process cartridge P1 or the developing unit cartridge.

Further, an image forming apparatus 1 shown in FIG. 14 is a sheet bonding apparatus capable of preparing a bonding product bonded using a process cartridge 7*n* accommodating the powdery adhesive Tn and process cartridges 7*y*, 7*m*, and 7*c* accommodating printing toner Ty, printing toner Tm, and printing toner Tc, respectively. In the case where a black image such as a text is printed by the image forming apparatus 1, the black image is expressed by a process black obtained by superimposing the toner of yellow (Ty), the toner of magenta (Tm), and the toner of cyan (Tc). However, the black image may also be made capable of being expressed by a black printing toner by adding a fifth process cartridge using a black printing toner to an image forming unit 1*e*, for example. The present invention is not limited thereto, a kind and the number of the printing toner are capable of being changed depending on a purpose of the image forming apparatus 1.

In such a constitution, it is possible to simultaneously perform the toner printing of the text or the like and application of the powdery adhesive Tn. For this reason, even when the pre-print paper on which the text or the like is printed in advance is not used, it is possible to prepare a bonding product, from white paper, on which printing toner is printed.

Further, as a main constituent material of the powdery adhesive Tn, low-density polyethylene particles ("FLO-THENE UF-20S", manufactured by SUMITOMO SEIKA CHEMICALS CO., LTD.) may be used. By using the low-density polyethylene particles, it is possible to improve a parting property when the pressure-bonding postcard 61 is peeled.

Embodiment 2

In the embodiment 1, suppression of the print peeling of the print portion on the outside of the pressure-bonding postcard in the bonding step by applying the powdery adhesive Tn so that the application amount of the opposing powdery adhesive Tn during the folding bonding becomes smaller on the heating roller 32*b* side during the bonding than on the opposite side was described. In this embodiment, compared with the embodiment 1, the case where a bonding force of the product is changed will be described. Unless otherwise specified, a condition is the same as the condition in the embodiment 1.

(Measurement of Bonding Force by Powdery Adhesive)

Herein, strength of a printing portion when a product of, for example, the pressure-bonding postcard is obtained by bonding a sheet with the powdery adhesive Tn by the bonding device 32, i.e., the bonding force is measured in the following manner.

Part (a) of FIG. 15 is a schematic view showing a specification of a sample used for measurement of the bonding force, part (b) of FIG. 15 is a schematic view showing the sample in a completed state, and part (c) of FIG. is a schematic view showing a measuring method of the bonding force. As shown in part (a) of FIG. 15, the sample is prepared in the following manner. As the sheet P, the above-described paper ("GF-C081") is used. A press-contact region S1 indicated by a hatched line is formed by printing the powdery adhesive Tn with a 4 cm-width from a position of 2 cm from a leading end (side) of the sheet with respect to the sheet feeding direction. Next, a press-contact region S2 indicated by a hatched line is formed by printing the powdery adhesive Tn with a 4 cm-width from a position from a trailing end (side) of the sheet with respect to the sheet feeding direction. This sheet is folded by the folding device 31 and then is press-contacted by the bonding device 32. As shown in part (b) of FIG. 15, the bonded sheet is cut so as to have a width of 3 cm and a full length of 14 cm from the leading end thereof with respect to the sheet feeding direction.

As shown in part (c) of FIG. 15, the sample is supported by a chuck at each of sheet ends Q of long non-bonding portions. Then, a tensile test is conducted at a tensile speed of 50 mm/min by a universal testing machine ("TENSILON RTG-1225", manufactured by A&D Company, Limited) (not shown), so that a stress-strain curve is obtained.

FIG. 16 is the resultant stress-strain curve. The abscissa represents a chuck movement amount, and the ordinate represents a tensile stress per unit sample width. A section from 0 mm to an upper yield point is defined as a section A, and a subsequent section is defined as a section B. The section A is an elastic deformation region, so that peeling of the press-contact region does not occur.

Therefore, when the tension is stopped, the sample can be held in an original shape. On the other hand, the section B is a plastic deformation region. In the following, herein, a tensile stress per unit width is defined as the bonding force.

A specific example of this embodiment is shown in a table 2 below. In the table 2, an application ratio of the powdery adhesive Tn to the region 61*a* and the region 61*c*, a total application amount of the powdery adhesive Tn, the bonding force, and the print peeling are shown. Parts (a) to (d) of FIG. 17 show images of bonding cross sections in conditions J, K, L, and M, respectively, in the table 2. In the table 2, the ratio of the application amount of the powdery adhesive Tn to the region 61*a* and the region 61*c* (61*a*:61*c*) is fixed to 1:9, and a total application amount in the region 61*a* and the region 61*c* is changed. The total application amount of the powdery adhesive Tn was 1.0 g/cm$^2$ in the condition J, 0.9 mg/cm$^2$ in the condition K, 0.8 mg/cm$^2$ in the condition L, and 0.7 g/cm$^2$ in the condition M.

TABLE 2

| | CONDITION | | | |
|---|---|---|---|---|
| | J | K | L | M |
| R*1 (61a:61c) | 1:9 | 1:9 | 1:9 | 1:9 |
| PBAA*2 (mg/cm$^2$) | 1.0 | 0.9 | 0.8 | 0.7 |
| BF*3 (N/cm) | 0.2 | 0.18 | 0.16 | 0.14 |
| PP*4 | ○ | ○ | ○ | ○ |

*1"R" is the ratio.
*2"PBAA" is the powdery adhesive application amount.
*3"BF" is the bonding force.
*4"PP" is the print peeling.

The bonding force at this time was 0.2 N/cm in the condition J, 0.18 N/cm in the condition K, 0.16 N/cm in the condition L, and 0.14 N/cm in the condition M. That is, it is understood that the bonding force becomes higher when the application amount of the powdery adhesive Tn becomes larger, and becomes lower when the application amount of the powdery adhesive becomes smaller. From this, the bonding force can be changed by changing the application amount of the powdery adhesive Tn. Further, at this time, the print peeling of the printing toner on the outside of the pressure-bonding postcard does not occur. This is because the ratio (61*a*:61*c*) is set to 1:9, so that the application amount of the powdery adhesive Tn is made smaller in the region 61*a* than in the region 61*c*.

As described above, according to this embodiment, also, when the bonding force is changed, the print peeling can be suppressed. By this, it becomes possible to output the pressure-bonding postcard with a desired bonding degree for each user while suppressing the print peeling.

[Constitution 1]

A sheet bonding apparatus comprising:

applying means configured to apply a powdery adhesive onto a sheet;

fixing means configured to fix the powdery adhesive, on the sheet, applied onto the sheet by the applying means;

folding means configured to fold the sheet passed through the fixing means; and bonding means configured to bond together folded surfaces of the sheet with the powdery adhesive by heating the sheet folded by the folding means, the bonding means including a heating member and a non-heating member which oppose to each other and which are for bonding the sheet by nipping the sheet therebetween, wherein two regions opposing to each other when the folding means folds the sheet are a first region and a second region, and wherein in a case that when the bonding means bonds the folded sheet, the first region is positioned on a heating member side and the second region is positioned on a non-heating member side, the applying means applies the powdery adhesive so that an application amount of the powdery adhesive on the sheet is smaller in the first region than in the second region.

[Constitution 2]

A sheet bonding apparatus according to the constitution 1, wherein the applying means includes an image bearing member, charging means configured to electrically charge a surface of the image bearing member, exposure means configured to expose the charged surface of the image bearing member to form an electrostatic latent image, developing means configured to develop the electrostatic latent image by supplying the powdery adhesive to the image bearing member, and the transfer means configured to transfer an image of the powdery adhesive onto the sheet.

[Constitution 3]

A sheet bonding apparatus according to the constitution 2, wherein the applying means applies the powdery adhesive so that a thickness of the powdery adhesive in the first region is smaller than a thickness of the powdery adhesive in the second region with respect to a thickness direction of the sheet.

[Constitution 4]

A sheet bonding apparatus according to the constitution 3, wherein the applying means controls the thickness of the powdery adhesive for each region by controlling an exposure potential of the surface of the image bearing member under control of the exposure means.

[Constitution 5]

A sheet bonding apparatus according to the constitution 2, wherein the applying means controls the application amount for each region by controlling a number of dots per unit area of the surface of the image bearing member under control of the exposure means.

[Constitution 6]

A sheet bonding apparatus according to the constitution 1, wherein the applying means includes a powder accommodating portion configured to accommodate the powdery adhesive, and wherein the powdery adhesive is capable of being externally supplied to the power accommodating portion.

[Constitution 7] A sheet bonding apparatus according to the constitution 6, wherein to the power accommodating portion, the powdery adhesive is supplied from a supply container detachably mountable to the sheet bonding apparatus.

[Constitution 8]

A sheet bonding apparatus according to the constitutions 1 to 7, wherein at least a part of the applying means is a cartridge detachably mountable to the sheet bonding apparatus, and wherein the sheet bonding apparatus is capable of switching between a state in which the sheet is capable of being bonded by the powdery adhesive through mounting of, as the cartridge, a first cartridge in which the powdery adhesive is accommodated and a state in which the image is capable of being formed on the sheet by printing toner through mounting of, as the cartridge, a second cartridge in which the printing toner is accommodated.

[Constitution 9]

A sheet bonding apparatus according to any one of the constitutions 1 to 8, further comprising image forming means configured to form an image with printing toner on the sheet, wherein the applying means is capable of applying the powdery adhesive onto the sheet on which the image is formed by the image forming means.

[Constitution 10]

A sheet bonding apparatus according to any one of the constitutions 1 to 9, wherein a main constituent material of the powdery adhesive is low density polyethylene.

As described above, according to the present invention, in the sheet bonding apparatus for outputting the pressure-bonded printed matter, the print peeling on the outside of the printed matter in the bonding step can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-005244 filed on Jan. 17, 2023, which is hereby incorporated by reference herein in its entirety.

What is claimed is:

1. A sheet bonding apparatus comprising:

applying means configured to apply a powdery adhesive onto a sheet;

fixing means configured to fix the powdery adhesive, on the sheet, applied onto the sheet by the applying means;

folding means configured to fold the sheet passed through the fixing means; and bonding means configured to bond together folded surfaces of the sheet with the powdery adhesive by heating the sheet folded by the folding means, the bonding means including a heating member and a non-heating member which oppose to each other and which are for bonding the sheet by nipping the sheet therebetween, wherein two regions opposing to each other when the folding means folds the sheet are a first region and a second region, and wherein in a case that when the bonding means bonds the folded sheet, the first region is positioned on a heating member side and the second region is positioned on a non-heating member side, the applying means applies the powdery adhesive so that an application amount of the powdery adhesive on the sheet is smaller in the first region than in the second region.

2. A sheet bonding apparatus according to claim 1, wherein the applying means includes an image bearing member, charging means configured to electrically charge a surface of the image bearing member, exposure means configured to expose the charged surface of the image bearing member to form an electrostatic latent image, developing means configured to develop the electrostatic latent image by supplying the powdery adhesive to the image bearing member, and transfer means configured to transfer an image of the powdery adhesive onto the sheet.

3. A sheet bonding apparatus according to claim 2, wherein the applying means applies the powdery adhesive so that a thickness of the powdery adhesive in the first region is smaller than a thickness of the powdery adhesive in the second region with respect to a thickness direction of the sheet.

4. A sheet bonding apparatus according to claim 3, wherein the applying means controls the thickness of the powdery adhesive for each region by controlling an exposure potential of the surface of the image bearing member under control of the exposure means.

5. A sheet bonding apparatus according to claim 2, wherein the applying means controls the application amount for each region by controlling a number of dots per unit area of the surface of the image bearing member under control of the exposure means.

6. A sheet bonding apparatus according to claim 1, wherein the applying means includes a powder accommodating portion configured to accommodate the powdery adhesive, and wherein the powdery adhesive is capable of being externally supplied to the power accommodating portion.

7. A sheet bonding apparatus according to claim 6, wherein to the power accommodating portion, the powdery adhesive is supplied from a supply container detachably mountable to the sheet bonding apparatus.

8. A sheet bonding apparatus according to claim 1, wherein at least a part of the applying means is a cartridge detachably mountable to the sheet bonding apparatus, and wherein the sheet bonding apparatus is capable of switching between a state in which the sheet is capable of being bonded by the powdery adhesive through mounting of a first cartridge, as the cartridge, in which the powdery adhesive is accommodated and a state in which the image is capable of being formed on the sheet by printing toner through mounting of a second cartridge, as the cartridge, in which the printing toner is accommodated.

9. A sheet bonding apparatus according to claim 1, further comprising image forming means configured to form an image with printing toner on the sheet, wherein the applying means is capable of applying the powdery adhesive onto the sheet on which the image is formed by the image forming means.

10. A sheet bonding apparatus according to claim 1, wherein a main constituent material of the powdery adhesive is low density polyethylene.

* * * * *